United States Patent
Bahl

(10) Patent No.: US 9,438,787 B2
(45) Date of Patent: Sep. 6, 2016

(54) DEVICE AND METHOD FOR MAKING MEASUREMENTS

(71) Applicant: Vivaan R Bahl, Palo Alto, CA (US)

(72) Inventor: Vivaan R Bahl, Palo Alto, CA (US)

( * ) Notice: Subject to any disclaimer, the term of this patent is extended or adjusted under 35 U.S.C. 154(b) by 465 days.

(21) Appl. No.: 14/064,182

(22) Filed: Oct. 27, 2013

(65) Prior Publication Data
US 2015/0116483 A1 Apr. 30, 2015

(51) Int. Cl.
| | |
|---|---|
| *G06K 9/00* | (2006.01) |
| *H04N 5/232* | (2006.01) |
| *G01B 11/26* | (2006.01) |
| *G01B 11/02* | (2006.01) |

(52) U.S. Cl.
CPC ........... *H04N 5/23216* (2013.01); *G01B 11/02* (2013.01); *G01B 11/26* (2013.01); *H04N 5/23222* (2013.01); *H04N 5/23293* (2013.01)

(58) Field of Classification Search
CPC ............. G06K 9/6201; G06K 9/6215; H04N 5/23203; H04N 5/23229; H04N 5/23296; H04N 5/23222; H04N 5/23293
USPC .......................................... 382/100; 348/135
See application file for complete search history.

(56) References Cited

U.S. PATENT DOCUMENTS 6,252,632 B1 * 6/2001 Cavallaro .............. H04N 5/262
348/585
8,204,684 B2 6/2012 Forstall et al.

OTHER PUBLICATIONS

Kizer, "Brief Users Guide for the TI-89 Titanium", http://www.grafcalcwhiz.com/Instructions/tishrtusrguide89.htm, Oct. 26, 2013, 18 pp.
"TI-89 series", *Wikipedia*, http://en.wikipedia.org/wiki/TI-89_series, Jan. 16, 2014, 5 pp.

* cited by examiner

*Primary Examiner* — Stephen R Koziol
*Assistant Examiner* — Shaghayegh Azima
(74) *Attorney, Agent, or Firm* — Ronald J. Meetin

(57) ABSTRACT

An information-presentation device (100) contains a viewing screen (108) and an image-gathering component (106). The viewing screen presents first and second reference icons (136 and 138) having an adjustable reference characteristic controlled with substantially only a single adjustable parameter. The image-gathering component provides the screen with frames of a video image of a scene in which first and second scene locations (152 and 154) have a scene characteristic whose value is to be approximately determined. A user first causes the first reference icon to be approximately superimposed on the first scene location in a captured frame of the image. The user then causes the second reference icon to be approximately superimposed on the second scene location in the captured frame as the adjustable parameter is adjusted to enable the reference characteristic to approximately match the scene characteristic and thereby provide a measurement of the scene characteristic.

30 Claims, 9 Drawing Sheets

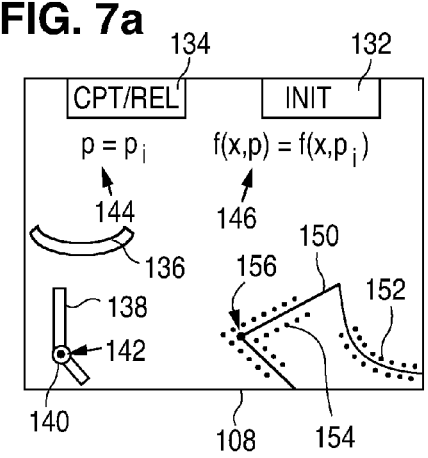
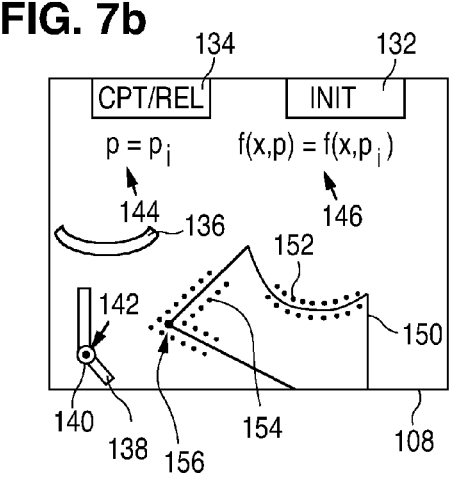
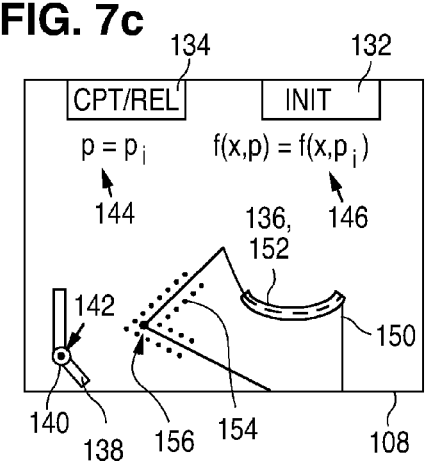
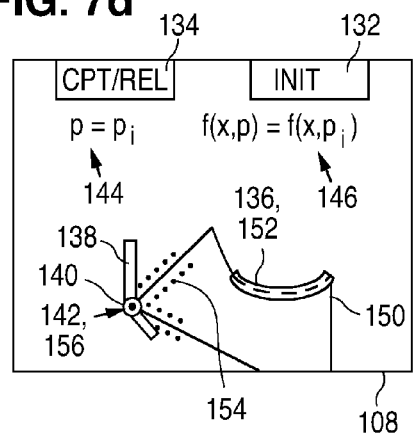
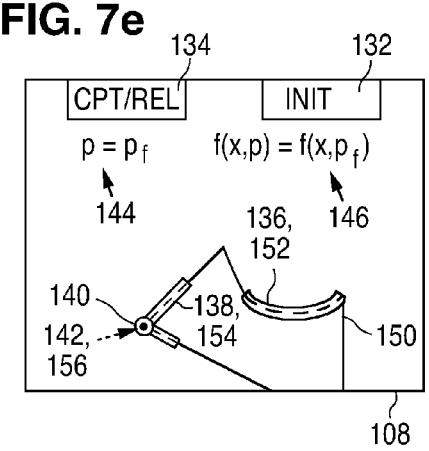

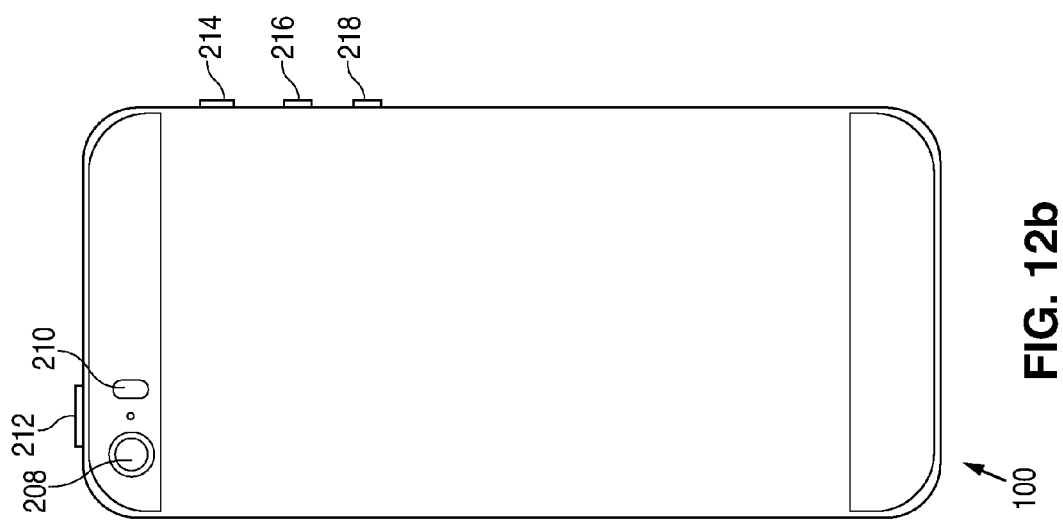
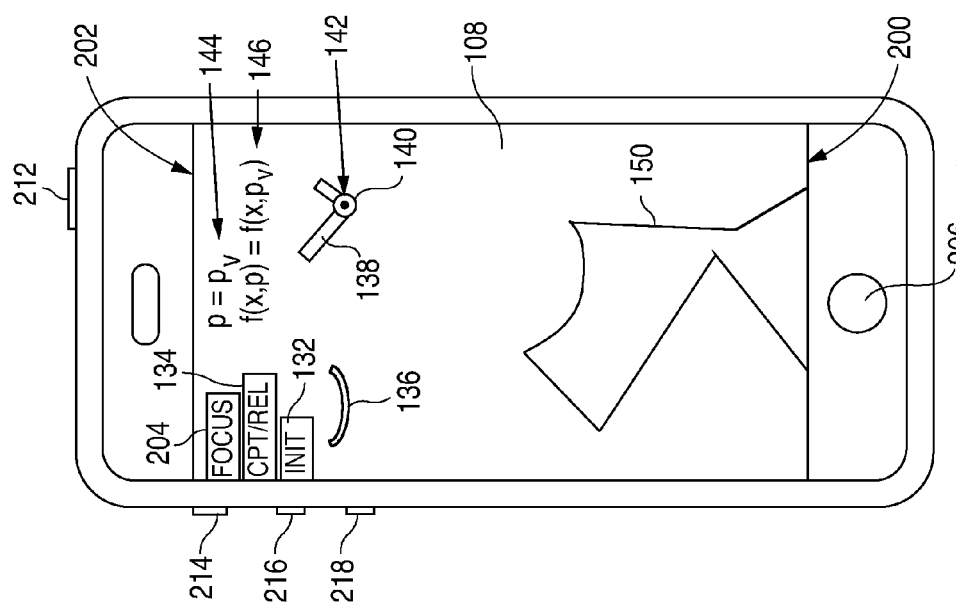
FIG. 12a
FIG. 12b

DEVICE AND METHOD FOR MAKING MEASUREMENTS

FIELD OF USE

This invention relates to measurements.

BACKGROUND

Distances, such as lengths, widths, and thicknesses, are commonly measured with rulers. FIG. 1 illustrates an example of how ruler 20 is used to measure length L of elongated object 22. Ruler 20 is positioned parallel to the length of object 22. The value of length L is then approximately the difference between the ruler distance markings opposite the longitudinal ends of object 22. Measuring length L is simplified when one longitudinal end of object 22 is opposite the zero-distance marking on ruler 20. In that case, the value of length L is approximately the value of the ruler distance marking opposite the other longitudinal end of object 20.

Angles are commonly measured with protractors. FIGS. 2a and 2b illustrate how manual protractor 30 is used to measure angle α formed by a pair of straight lines 32 that meet at angle vertex 34. Vertex 36 of protractor 30 is placed at angle vertex 34. The value of angle α is then approximately the difference between the protractor angular markings through which lines 32 pass. Similar to how measuring length L is simplified, measuring angle α is simplified when one of lines 32 passes through one of the zero-angular markings on protractor 30. The value of angle α is then the value of the protractor angular marking through which the other of lines 32 passes.

Another type of protractor is electronic protractor 40 as shown in FIG. 3. Electronic protractor is formed with two straight legs 42 hingeably connected at pivot 44. Angle α is measured with protractor 40 by placing it over angle α so that legs 42 are respectively aligned with lines 32 that define angle α. The center 46 of pivot 44 overlies angle vertex 34. Video display 48 on one of legs 42 provides the value of angle α.

Situations arise in which it is desirable to measure a distance or an angle but no ruler or protractor is readily available to measure the distance of angle. Situations also arise in which it would be difficult to measure a distance or an angle with a ruler or protractor even if a ruler or protractor were readily available. For instance, the distance or angle may be of such a nature that a ruler or protractor cannot be readily aligned to the distance or angle in the way needed to make the measurement.

Mobile information-presentation devices having video-imaging and mathematics-computation capabilities are in common use. As an example of such a device, FIG. 4 illustrates calculator 50 having video screen 52 for presenting the results of calculations performed by entering data via keyboard 54. Calculator 50 provides various trigonometric functions such as sine, cosine, and tangent as well as hyperbolic functions such as inverse sine ($\sin^{-1}$), inverse cosine ($\cos^{-1}$), and inverse tangent ($\tan^{-1}$). By appropriate programming of calculator 50, screen 52 can often illustrate curves of various mathematical functions.

A substantial percentage of people are more likely to have ready access to mobile information-presentation devices having video-imaging and mathematics-computation capabilities than to rulers and protractors, especially protractors. In light of this, it would be desirable for a mobile information-presentation device having video-imaging and mathematics-computation capabilities to also have the capability to perform various measurements, including measuring angle and lines.

GENERAL DISCLOSURE OF THE INVENTION

The present invention provides such a device. In accordance with the invention, an information-presentation device capable of performing various types of measurements contains a viewing screen, an image-gathering component, and a control system. The viewing screen presents first and second reference icons having an adjustable reference characteristic controlled with substantially only a single adjustable parameter. The image-gathering component, basically a video camera, provides the screen with frames of a video image of a scene in which first and second scene locations have a scene characteristic whose value is to be approximately determined.

The control system is responsive to external instructions, i.e., instructions supplied from outside the present information-presentation device, for causing the reference icons to move on the screen. The external instructions are normally generated in response to actions of one or more humans and can be furnished to the control system in various ways. Many external instructions are supplied by moving an instructing object, such as inanimate elongated object or a finger of a human hand, over each reference icon so as to cause it to translate (be dragged) or/and rotate.

A measurement operation in accordance with the invention entails getting to a situation in which the first reference icon is approximately superimposed on the first scene location in a captured frame of the image of the scene. This situation can generally be reached according to either of two routes referred to, for convenience, as the superimpose-first route and the capture-first route.

In the superimpose-first route, the first reference icon is first approximately superimposed on the first scene location. The superimposition action typically involves having a user of the present information-presentation device rotate or/and translate the device so as to cause the first scene location to move on the screen. Additionally or alternatively, the control system may be supplied with external instruction that causes the first reference icon to move on the screen. This external instruction may be supplied by a procedure in which the user positions an instructing object over the first reference icon and then moves the object over the screen. The moving of the first reference icon is typically done when it is initially at an unsuitable location or/and orientation on the screen for performing the measurement operation. In any event, the first scene location or/and the first reference icon are appropriately moved until visually the first reference icon is approximately situated over the first scene location. While the first reference icon is thus approximately superimposed on the first scene location, the control system causes a frame of the image of the scene to be captured in response to external instruction typically supplied by the user.

In the capture-first route, the control system first causes a frame of the image to be captured in response to external instruction typically supplied by the user. Responsive to further external instruction typically supplied by having the user position an instructing object over the first reference icon and then move the object over the screen so that the first reference icon is visually approximately situated over the first screen location, the control system causes the first reference icon to be approximately superimposed on the first scene location. The capture-first route generally yields a more accurate measurement than the superimpose-first route but takes longer to perform than the superimpose-first route.

Responsive to further external instruction, the control system causes the second reference icon to be approximately superimposed on the second scene location in the captured frame as the adjustable parameter is adjusted to enable the reference characteristic to approximately match the scene characteristic. This further superimposition action normally entails having the user instruct the control system, typically by positioning an instructing object over the second reference icon and then moving the object over the screen, in such a way as to cause the second reference icon to move until visually it is approximately situated over the second scene location in the captured frame.

With the first and second reference icons respectively approximately superimposed on the first and second scene locations in the captured frame, the device determines the value of the adjustable parameter, or the value of a further parameter containing the adjustable parameter, as an approximation to the value of the scene characteristic in the captured frame, thereby providing a measurement of the scene characteristic. The screen preferably displays that value of the adjustable or further parameter.

One embodiment of the inventive information-presentation device provides a capability to measure the angle between two lines appearing in the scene on the screen. The two lines, referred to as the first and second scene lines, respectively implement the first and second scene locations. The first and second reference icons in the angle-measurement embodiment are respectively implemented with first and second reference lines deployed at a reference angle that implements, or varies with, the adjustable parameter.

The first reference line is approximately superimposed on the first scene line before or after the frame of the image is captured. The second reference line is approximately superimposed on the second scene line in the captured frame by a procedure in which the control system adjusts the reference angle in response to external instruction so as to cause the second reference line to rotate until the reference angle approximately matches the angle between the scene lines.

More particularly, the first scene line, or a straight-line approximation to the first scene line if it is materially curved, and the second scene line, or a straight-line approximation to the second scene line if it is materially curved, meet actually or by imaginary extension at a scene vertex point. The reference lines meet at a reference vertex point preferably demarcated by a vertex reference control icon. The control system causes the vertex reference control icon to translate in response to external instruction until the vertex reference control icon is approximately superimposed on the scene vertex point in the captured frame. The control system then causes the second reference line to rotate about the reference vertex point in response to external instruction until the second reference line is approximately superimposed on the second scene line in the captured frame.

The inventive device determines the value of the reference angle in the captured frame as an approximation to the value of the angle between the scene lines. The value of the reference angle in the captured frame is preferably determined as either (a) the inverse tangent of the ratio of (i) the distance in normalized linear screen units from a further point, spaced apart from the reference vertex point, on the first reference line to the second reference line along a perpendicular to the first reference line in the captured frame to (ii) the distance in normalized linear screen units from the further point to the vertex in the captured frame or (b) the inverse cotangent of the inverse ratio of these two distances in the captured frame.

Another embodiment of the inventive information-presentation device provides a capability to measure a distance, referred to as the selected distance, appearing in the scene on the screen. The first reference icon in the distance-measurement embodiment is implemented with a pair of first reference end-point icons which respectively demarcate a pair of first reference end points separated by a reference distance. The first scene location is implemented with a pair of calibration end points separated by a calibration distance, i.e., a known distance. The first reference end-point icons are respectively approximately superimposed on the calibration end points before or after the frame of the image is captured.

The second reference icon in the distance-measurement embodiment is implemented with a pair of second reference end-point icons which respectively demarcate a pair of second reference end points separated by an adjustable distance which implements, or varies with, the adjustable parameter. The second scene location is implemented with a pair of distance end points separated by the selected distance. The second reference end-point icons are approximately superimposed on the distance end points in the captured frame by a procedure in which the control system adjusts the adjustable distance in response to external instruction until the adjustable distance approximately equals the selected distance in the captured frame.

The inventive device approximates the value of the selected distance as $d_{cal}d_{adj}/d_{ref}$ where $d_{cal}$ is the calibration distance, $d_{adj}$ is the adjustable distance in normalized linear screen units in the captured frame, and $d_{ref}$ is the reference distance in normalized linear screen units in the captured frame. Adjustable distance $d_{adj}$, i.e., its value, in the captured frame is preferably determined as the square root of the sum of (a) the square of the distance in normalized linear screen units from a further point, spaced apart from the second reference end points, to one of the second reference end points in one of a pair of substantially perpendicular measurement directions in the captured frame and (b) the square of the distance in normalized linear screen units from the further point to the other of the second reference end points in the other of the measurement directions in the captured frame.

A further embodiment of the inventive information-presentation device provides a capability to measure a parameter indicative of the curvature of a curve, referred to as the scene curve, in the scene on the screen. The first scene location in the curvature-measurement embodiment is implemented with a point, referred to as the selected point, on the scene curve. The first reference icon is implemented with a reference-point icon which demarcates a reference point. The reference-point icon is approximately superimposed on the selected point before or after the frame of the image is captured.

The second scene location in the curvature-measurement embodiment is implemented with the scene curve. The second reference icon is implemented with a reference curve whose curvature is controlled by the adjustable parameter. The reference curve is normally representable by a function consisting of one of: a power function for a power different from one, a polynomial function having only one adjustable parameter, a basic exponential function, a basic logarithmic function, a basic non-inverse trigonometric function, a basic inverse trigonometric function, a basic non-inverse hyperbolic function, a basic inverse hyperbolic function, and a combination of any two or more of the preceding eight functions for which there is only one adjustable parameter.

The reference curve is approximately superimposed on the scene curve in the captured frame by a procedure in which the control system adjusts the adjustable parameter in response to external instruction for enabling the shape of the reference curve to approximately match the shape of the scene curve in the captured frame. The inventive device determines the value of an indicator of the curvature of the reference curve in the captured frame as an approximation to the value of a like indicator of the curvature of the scene curve. The screen preferably presents a function representing the reference curve in the captured frame with the value of the indicator of the curvature of the reference curve in the captured frame being presented in the function.

More particularly, the reference curve is preferably represented by a curve function expressible as $f(x,p)=y$ where x is an independent variable, y is a dependent variable, and p is the adjustable parameter. The value of parameter p in the captured frame is the value of the indicator of the curvature of the reference curve in the captured frame and thereby approximately the value of the indicator of the curvature of the scene curve. The curve function is solved for adjustable parameter p to produce a parameter function expressible as $g(x,y)=p$. The inventive device then preferably determines the value of parameter p in the captured frame from parameter function $g(x,y)$ by using (a) the distance in normalized linear screen units from a further point along a first straight line to a first point on the reference curve in the captured frame as the value of variable x in parameter function $g(x,y)$ and (b) the distance in normalized linear screen units from the further point along a second straight line, perpendicular to the first line, to a second point on the reference curve in the captured frame as the value of variable y in parameter function $g(x,y)$.

Certain parts of the inventive information-presentation device are typically implemented in software. Computer software algorithms are, for instance, normally employed to calculate the value of (i) the inverse tangent or inverse cotangent as the value of the reference angle in the captured frame for the angle-measurement embodiment, (ii) $d_{adj}$ of the adjustable distance in the captured frame for the distance-measurement embodiment, and (iii) parameter p in the captured frame for the curvature-measurement embodiment. The reference and control icons are normally defined in software.

The inventive information-presentation device is typically mobile. As a result, the image-generating component can typically be rotated through a full 360° when aimed in any direction. In some cases, this rotation capability facilitates approximately superimposing the first reference icon on the first scene location or/and the second reference icon on the second scene location. For example, the device's rotation capability enables the first reference line in the angle-measurement embodiment to be approximately superimposed on the first scene line. The device's rotation capability also enables the reference curve in the curvature-measurement embodiment to be roughly aligned to the scene curve before the adjustable parameter is adjusted so as to cause the reference curve to be approximately superimposed on the scene curve in the captured frame.

In short, the present invention enables a number of different types of measurements to be performed quickly and easily. The invention takes advantage of the fact that a substantial percentage of people have ready access to mobile information-presentation devices having video-imaging and mathematics-computation capabilities, thereby avoiding the need for conventional measurement hardware such as rulers and protractors. The invention avoids the tedium of conventional manual measurement. The inventive device can replace expensive surveying equipment for angle and distance measurement. The invention thus provides a substantial advance in the measurement field.

BRIEF DESCRIPTION OF THE DRAWINGS

FIGS. 7a, 7b, 7c, 7d, and 7e are front views of the viewing screen in the information-presentation device of FIG. 5 during the course of the measurement operation.

FIGS. 12a and 12b respectively are front and back views of a mobile physical embodiment of an information-presentation device that implements the block diagram of FIG. 5.

Like reference symbols are employed in the drawings and in the description of the preferred embodiment to represent the same, or very similar, item or items.

DESCRIPTION OF THE PREFERRED EMBODIMENTS

A. Preliminary Information

Figure 1:
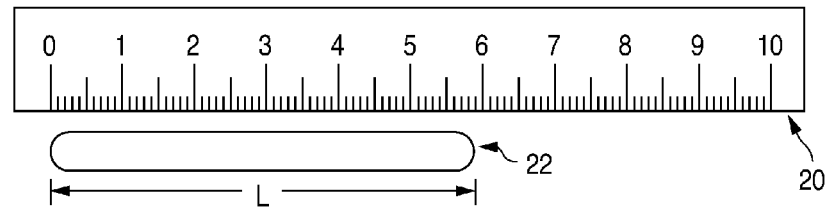
FIG. 1 is a diagram showing how a conventional ruler is used to measure the length of an elongated object.
Figure 2A:
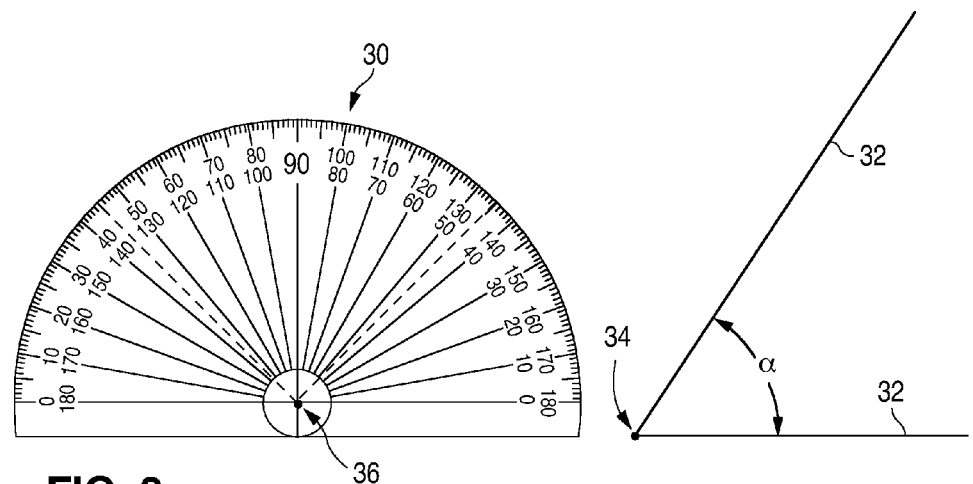
FIGS. 2a and 2b are diagrams showing how a conventional manual protractor is used to measure an angle.
Figure 2B:
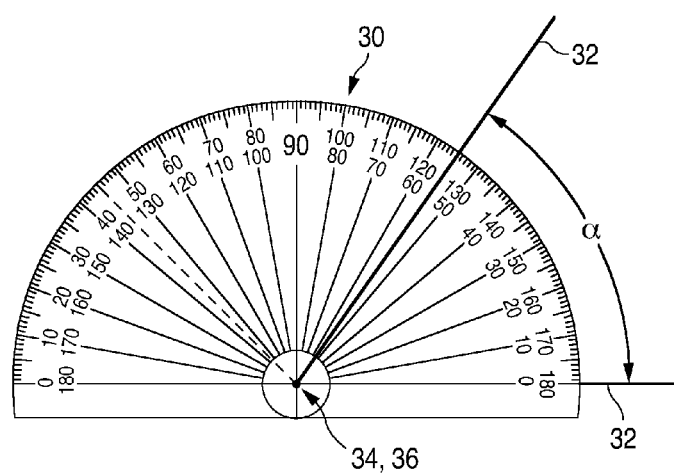
Figure 3:
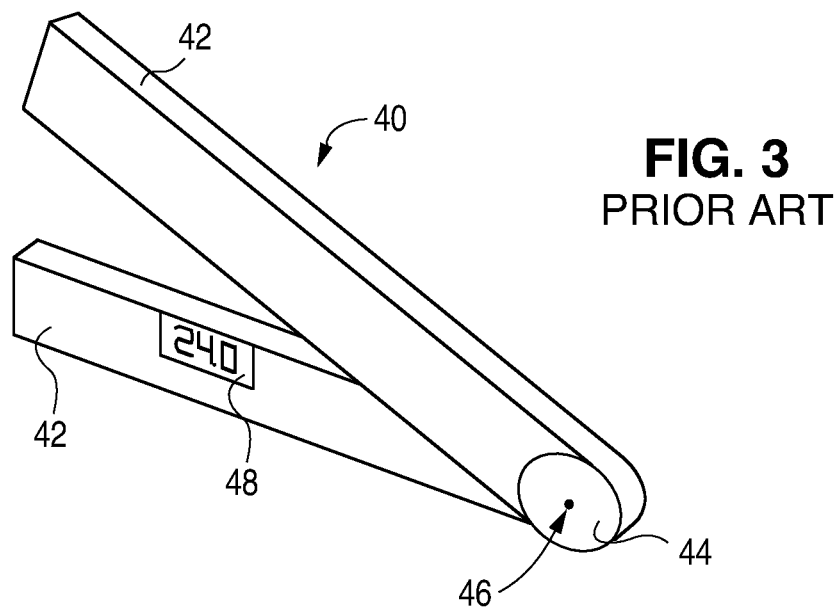
FIG. 3 is a perspective view of a conventional electronic protractor.
Figure 4:
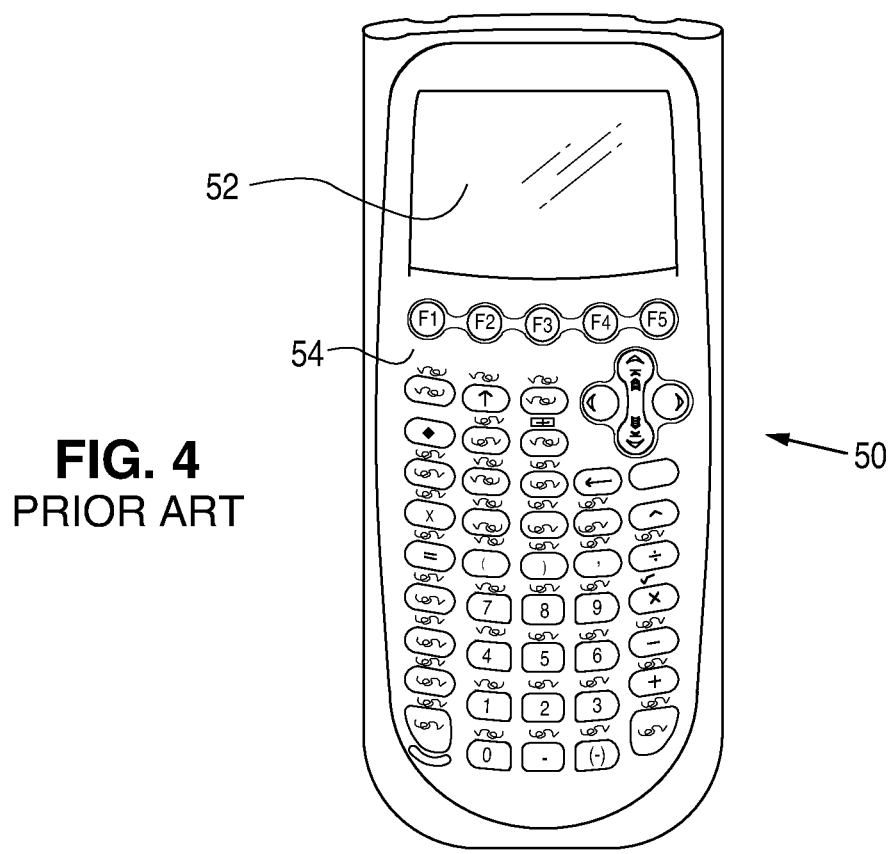
FIG. 4 is a front view of a conventional electronic calculator.

A viewing screen that provides an electronic image normally contains a two-dimensional array of largely identical picture elements (pixels) arranged in rows and columns. The row direction is the direction in which the rows of pixels extend. The column direction is the direction in which the columns of pixels extend. The pixels are typically of rectangular shape. In that case, the column direction is perpendicular to the row direction. Also, each interior pixel in the array laterally adjoins two other pixels in the row direction and two other pixels in the column direction.

As used herein, a "linear screen unit" is the minimum fraction of the dimension of a viewing screen in a particular direction for which the image presentation on one part of a viewing screen can differ from the image presentation on another part of the screen in that direction. Accordingly, a linear screen unit is non-dimensional, i.e., a pure number.

For a viewing screen consisting of pixels, a linear screen unit is a pixel taken in a particular direction. When the pixels are largely identical rectangular pixels arranged in rows and columns, a linear screen unit in the row direction is a pixel taken in the row direction, and a linear screen unit in the column direction is a pixel taken in the column direction. In terms of linear screen units, the size of an item appearing on a viewing screen of fixed numbers of pixels in the row and column directions is independent of the physical size of the screen. That is, as the physical size of the screen changes, the item consists of a fixed number of linear screen units in the row direction and of a fixed number of linear screen units in the column direction.

A linear screen unit in a first measurement direction is identical in actual distance value to a linear screen unit in a second measurement direction perpendicular to the first measurement direction when the pixels are square. However, a linear screen unit in the first measurement direction differs in actual distance value from a linear screen unit in the second measurement direction when the pixels are oblong (non-square) rectangles For instance, if the measurement directions respectively are the row and column direction, a linear screen unit in the row direction and a linear screen unit in the column direction are identical in actual distance value when the pixels are squares but differ in actual distance value when the pixels are oblong rectangles.

Certain of the information-presentation devices configured in accordance with the invention to perform measurements employ measurement computer algorithms, described further below, dependent on a screen distance in a first measurement direction relative to a screen distance in a second measurement direction perpendicular to the first measurement direction. Each such algorithm is thus effectively dependent on the ratio R1/2 of the screen distance in the first measurement direction to the screen distance in the second measurement direction. For square pixels, screen distance ratio R1/2 is calculated simply as the number of linear screen units in the first measurement direction divided by the number of linear screen units in the second measurement direction. However, this calculation does not yield screen distance ratio R1/2 when the pixels are oblong rectangles because a linear screen unit in the first measurement direction differs in actual distance value from a linear screen unit in the second measurement direction.

With the foregoing in mind, "normalized linear screen units" herein means linear screen units in each of two different measurement directions for which the linear screen units in one of the measurement directions are adjusted to accommodate any difference between the actual distance values of the linear screen units in the two measurement directions such that any given screen distance is the same number of normalized screen units in both measurement directions. For instance, screen distance ratio R1/2 is then calculated as the number of normalized linear screen units in the first measurement direction divided by the number of normalized screen units in the second measurement direction regardless of pixel shape.

The normalization can be performed on the linear screen units in either measurement direction. If the normalization is done on the linear screen units in the first measurement direction, a normalized linear screen unit in the first measurement direction equals an actual linear screen unit in the first measurement direction multiplied by the ratio of the lateral dimension of a pixel in the first measurement direction to the lateral dimension of a pixel in the second measurement direction. A normalized linear screen unit in the second measurement direction then equals an actual linear screen unit in the second measurement direction. The opposite arises if the normalization is done on the linear screen units in the second measurement direction. In either case, a calculation such as that dependent on a screen distance in the first measurement direction relative to a screen distance in the second measurement direction perpendicular to the first measurement direction is independent of pixel shape. As with linear screen units, normalized linear screen units are non-dimensional.

An information-presentation device configured according to the invention for performing certain types of measurements contains a viewing screen and a thin, normally transparent, input structure which is situated along the viewing screen, e.g., over the front of screen, and is therefore adjacent to the screen where "adjacent" here means adjacent in the direction perpendicular to the row and column directions. The screen-adjacent input structure, hereafter generally referred to as the "SA input structure", is sensitive to changes in pressure, to changes in electrical properties such as capacitance or resistance, or to changes in light. As used herein, an "instructing object" means an object, such as a human-controlled inanimate elongated object or a finger of a human hand, for supplying external instructions to the SA input structure.

If the SA input structure is pressure sensitive, external instructions are supplied to it by bringing the instructing object into contact with the SA input structure or the screen so as to exert appropriate pressure on selected portions of the SA input structure. Supplying external instructions to a pressure-sensitive SA input structure may include moving the instructing object over the screen while maintaining the instructing object in contact with the SA input structure or the screen so as to continue exerting appropriate pressure on selected portions of the SA input structure.

If the SA input structure is sensitive to changes in capacitance or resistance, external instructions are supplied to the SA input structure by bringing the instructing object into contact, or near contact, with the SA input structure or the screen so as to cause electrical changes corresponding to the external instructions to be produced in the SA input structure. Supplying external instructions to a capacitance-sensitive or resistance-sensitive SA input structure may include moving the instructing object over the screen while maintaining the instructing object in contact, or in near contact, with the SA input structure or the screen so as to continue causing electrical changes corresponding to the external instructions to be produced in the SA input structure.

If the SA input structure is sensitive to changes in light, the instructing object provides a controllable light beam. External instructions are supplied to a light-sensitive SA input structure by directing the light beam at the SA input structure while the instructing object comes into contact, or near contact, with the SA input structure or the screen. Supplying external instructions to the light-sensitive SA input structure may include moving the instructing object over the screen while maintaining the instructing object in contact, or in near contact, with the SA input structure.

The expression "largely into contact" is, for simplicity, used below to mean into actual contact, or near contact, in connection with how close an instructing object must be brought to an SA input structure in order to provide it with external instructions. Whether actual contact with the SA input structure is needed to provide it with the instructions or whether near contact with the SA input structure is sufficient to provide it the instructions depends on the specific implementation of the SA input structure. The expression "largely in contact" is, for simplicity, similarly used below to mean in actual contact, or near contact, in connection with how close an instructing object must be brought to an SA input structure in order for it to receive external instructions.

B. Components of Inventive Measurement Device

Figure 5:
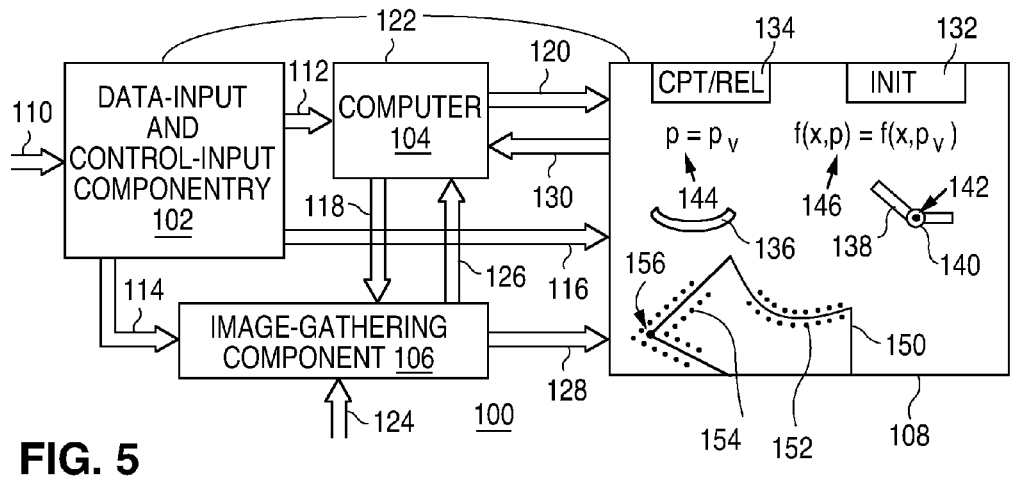
FIG. 5 is a block diagram of an information-presentation device having video-imaging, mathematics-computation, and measurement capabilities in accordance with the invention. The viewing screen in the information-presentation device of FIG. 5 illustrates an example of a general scene undergoing measurement.

FIG. 5 illustrates a mobile information-presentation device 100 provided with measurement capability according to the principles of the invention. Information-presentation device 100 contains data-input and control-input componentry 102 (hereafter generally "input componentry 102"), a computer 104, an image-gathering component 106, and a viewing screen 108. As described further below, viewing screen 108 presents frames of a moving video image collected by image-gathering component 106, basically a video camera, of a scene. The movement of the video image may arise due to movement of one or more portions of the scene or/and due to movement of information-presentation device 100.

Input componentry 102 receives external instructions 110 consisting of a group of data-input signals and control-input signals usually generated entirely, or nearly entirely, in response to actions of one or more humans. Componentry 102 includes a thin, normally transparent, input structure (not separately shown) which is situated along viewing screen 108, e.g., over the front of screen 108, and which is sensitive to changes in pressure, to changes in electrical properties such as capacitance or resistance, or to changes in light. The screen-adjacent input structure, again hereafter generally referred to as the "SA input structure", contains a group of input locations situated along, and respectively corresponding to, the pixels (described further below) of viewing screen 108. Each input location of the SA input structure is often referred to below as an "SA input location". Each SA input location is largely centered on the corresponding pixel of screen 108. Computer 104 associates each SA input location with the corresponding screen pixel.

An external instruction 110 is supplied to input componentry 102 via the SA input structure by bringing an instructing object largely into contact with a suitable one of the SA input locations. Inasmuch as the instructing object commonly overlies multiple SA input locations when it is brought largely into contact with the SA input structure, computer 104 employs a suitable algorithm to choose an appropriate one, e.g., the centermost, of the SA input locations. External instruction 110 supplied to the chosen SA input location is applied via computer 104 to the corresponding pixel of viewing screen 108.

Certain portions of the SA input structure are dedicated to receiving specific types of external instructions 110. These dedicated portions of the SA input structure are adjacent to various icons (described further below) on viewing screen 108. Accordingly, an external instruction 110 for one of the dedicated portions of the SA input structure is supplied to that dedicated portion by bringing an instructing object largely into contact with the SA input structure at the location of the icon adjacent to that dedicated portion.

Input componentry 102 may further variously include a hardware keyboard (not shown), a mouse (not shown), a touch pad (not shown), a software (virtual) keyboard (not shown), or/and a device (not shown) for receiving external instructions 110 in audio form, e.g., human-voice form. Such a software keyboard appears on viewing screen 108 when an instructing object is brought largely into contact with the portion of the SA input structure adjacent to one or more specified locations on screen 108.

Responsive to external instructions 110, componentry 102 supplies a group of data and computer-control signals 112 to computer 104 and a group of image-gathering control signals 114 to image-gathering component 106. Data and computer control signals 112 include signals generated from external instructions 110 supplied to the SA input structure. Componentry 102 may also supply a group of screen-data and screen-control signals 116 directly to screen 108 in response to external instructions 110. In the following material, instructions that constitute part of external instructions 110 are, for simplicity, generally referred to as "external instructions", i.e., without reference symbol "100".

Computer 104 consists of data-processing and data-storage circuitry. In response to data and computer-control signals 112, computer 104 supplies a group of image-gathering control signals 118 to image-gathering component 106 and a group of data and screen-control signals 120 to viewing screen 108. Computer 104 and input componentry 102, including the SA input structure, form a control system 122 for controlling the making of measurements according to the invention.

Responsive to image-gathering control signals 114 and 118, image-gathering component 106 gathers (or collects) a moving image, represented here as a group of image-input signals 124, of a scene and supplies the gathered image to computer 104 for processing by computer 104 and transmission to viewing screen 108 as part of data and screen-control signals 120. The gathered image and any related image-presentation signals provided from image-gathering component 106 to computer 104 are indicated as signals 126 in FIG. 5. Image-gathering component 106 may also provide a group of image-related signals 128 directly to screen 108.

Viewing screen 108 contains a two-dimensional array of largely identical pixels (not separately shown) arranged in rows and columns. The row direction extends in the horizontal direction in FIG. 5, i.e., parallel to the top or bottom of screen 108. The column direction extends in the vertical direction in FIG. 5, i.e., parallel to either side of screen 108. Screen 108 supplies a group of image-related signals 130 to computer 104.

Viewing screen 108 presents an initialization (INIT) global control icon 132 and a capture/release (CPT/REL) global control icon 134 for receiving external instructions by bringing an instructing object largely into contact with the portion of the SA input structure adjacent to global control icon 132 or 134. The external instructions for global control icons 132 and 134 are supplied to computer 104 in the forms of certain of data and computer-control signals 112. Instructing initialization icon 132 in the indicated way causes various measurement parameters to be set at respective initial values and various icons (other than global control icons 132 and 134) to be set at respective initial conditions. Instructing capture/release icon 134 in the indicated way while screen 108 is presenting frames of a moving video image of a scene causes a selected frame of the image to be captured by computer 104 and thereafter continuously presented on screen 108 until computer 104 becomes inactive, receives instruction to return to presenting a moving video image, or receives instruction to conduct other tasks. Instructing capture/release icon 134 in the indicated way while screen 108 is presenting a captured frame causes screen 108 to return to presenting a moving video image of a scene. Global control icons 132 and 134 are normally situated at respective largely fixed locations on screen 108.

Viewing screen 108 presents a first reference icon 136 and a second reference icon 138. Reference icons 136 and 138 can be of various shapes and sizes. For illustrative purposes, first reference icon 136 appears here as a curved arc. For illustrative purposes, second reference icon 138 appears here as a body having two legs that meet at a circular reference control icon 140 centered on a reference point 142. The shaping of reference icons 136 and 138 respectively as a curved body and a two-legged body is not meant to imply that icons 136 and 138 are in any way limited to the shapes shown in FIG. 5. In fact, the shape of each reference icon 136 or 138 in each of the angle-measurement, distance-measurement, and curvature-measurement embodiments described below for information-presentation device 100 is different than that shown in FIG. 5.

Each of reference icons 136 and 138 can, in general, variously be translated or/and rotated in response to external instruction supplied to control system 122 by bringing an instructing object largely into contact with the portion, or a selected part of the portion, of the SA input structure adjacent to reference icon 136 or 138 and then moving the instructing object over viewing screen 108, and thereby over the SA input structure, while maintaining the instructing object largely in contact with the SA input structure. This way of moving an icon, such as reference icon 136 or 138, is referred to as dragging. The size or/and shape of reference icon 136 or 138 can, in general, be changed in response to such external instruction. However, reference icon 136 or 138 can sometimes be of fixed shape or fixed size as occurs with first reference icon 136 in the below-described inventive angle-measurement and curvature-measurement embodiments of information-presentation device 100.

First reference icon 136 may include one or more reference control icons similar to reference control icon 140. Second reference icon 138 may similar include one or more such reference control icons in addition to reference control icon 140. Alternatively, reference control icon 140 may be absent so that second reference icon 138 has no reference control icon. Reference icons 136 and 138 can also share one or more reference control icons. In any event, each such reference control icon can variously be translated or/and rotated in response to external instruction supplied by bringing an instructing object largely into contact with the portion, or a selected part of the portion, of the SA input structure adjacent to that reference control icon and moving the instructing object over viewing screen 108 and the SA input structure while maintaining the instructing object largely in contact with the SA input structure.

Global control icons 132 and 134, reference icons 136 and 138, and reference control icons, such as reference control icon 140, normally continuously appear on viewing screen 108 during performance of a particular type of measurement in accordance with the invention regardless of changes in the scene whose image is presented on screen 108. All of these icons are normally generated in software loaded into computer 104 with reference icons 136 and 138 being personalized to accommodate a particular type of measurement according to the invention. Computer 104 may be provided with software programs for two or more types of measurement according to the invention. If so, for programming convenience, global control icons 132 and 134 typically function substantially the same in each software program and are typically located in largely the same places on screen 108.

Reference icons 136 and 138 are related to each other in such a way that they have an adjustable reference characteristic controlled with substantially only a single adjustable parameter whose value is varied in response to external instructions supplied to image-presentation device 100. The value of an item undergoing measurement is often approximately the value of the adjustable parameter for a corresponding specific relationship between reference icons 136 and 138. Viewing screen 108 then typically presents the value of the adjustable parameter at any instant, i.e., the latest determined value of the adjustable parameter. This is normally done in the form of an adjustable parameter reference equation 144 formed with a word or symbol identifying the adjustable parameter followed by an equals sign "=" followed by the then-existent value of the adjustable parameter. Letting symbol "p" generally represent the adjustable parameter and letting "$p_v$" represent the instantaneous value of parameter p, parameter reference equation 144 generally appears as "$p=p_v$" in FIG. 5.

When the value of an item undergoing measurement is approximately the value of the adjustable parameter for a corresponding specific relationship between reference icons 136 and 138, icons 136 and 138 are adjusted to have that specific relationship as described further below. Viewing screen 108 then presents the finally determined value of the adjustable parameter. If parameter reference equation 144 is used to present the then-existent value of the adjustable parameter, the value of the adjustable parameter in equation 144 upon completion of the measurement is approximately the value of the item being measured. Letting symbol "p" again represent the adjustable parameter and letting "$p_f$" represent the value of parameter p when the measurement is completed, equation 144 generally appears as "$p=p_f$" at the completion of the measurement as described below in connection with FIGS. 7a-7e.

An item undergoing measurement is, in some situations, characterizable in terms of a function of the adjustable parameter. This function contains the value of the adjustable parameter when reference icons 136 and 138 are adjusted to have the specific relationship for which the value of the item undergoing measurement is approximately the value of the adjustable parameter. In such situations, viewing screen 108 often presents this form of the function at any instant, i.e., the function with the latest determined value of the adjustable parameter. This is normally done in the form of a function reference equation 146 formed with a word or symbol identifying the function followed by an equals sign "=" followed by the function utilizing the then-existent value of the adjustable parameter. Letting symbol "$f(x,p)$" generally represent the function of the adjustable parameter where p again represents the adjustable parameter and where x is an independent variable, function reference equation 146 generally appears as "$f(x,p)=f(x,p_v)$" in FIG. 5 where "$p_v$" again represents the instantaneous value of parameter p. For example, if an item undergoing measurement is describable in terms of a parabolic function having an axis of symmetry in the column direction of screen 108, function reference equation 146 could generally appear as $f(x,p)=p_v x^2$ or as $y=p_v x^2$ where y is a dependent variable.

Upon adjusting reference icons 136 and 138 to have the requisite specific relationship, viewing screen 108 then presents the function utilizing the finally determined value of the adjustable parameter. When function reference equation 146 is used to present the function utilizing the then-existent value of the adjustable parameter, the value of the adjustable parameter in equation 146 is automatically updated to be the value of the adjustable parameter upon completion of the measurement and thus approximately the value of the item being measured. Letting symbol "f(x,p)" again represent the function of the adjustable parameter and letting "$p_f$" represent the value of parameter p when the measurement is completed, equation 146 generally appears as "f(x,p)=f(x,$p_f$)" at the completion of the measurement where parameter value $p_f$ explicitly appears in function f(x,$p_f$) as also described below in connection with FIGS. 7a-7e. In the above-mentioned example where the item undergoing measurement is describable in terms of a parabolic function having an axis of symmetry in the column direction of viewing screen 108, equation 146 could appear as f(x,p)=$p_f x^2$ or as y=$p_f x^2$ at the completion of the measurement.

The value of an item undergoing measurement may, in other situations, approximately be the value of a function of the adjustable parameter, rather than the value of the adjustable parameter itself, for a corresponding specific relationship between reference icons 136 and 138. In such situations, viewing screen 108 may present the value of this function at any instant, i.e., the latest determined value of the function. This can be done in the form of a reference equation, similar to parameter reference equation 144, formed with a word or symbol identifying the function followed by an equals sign "=" followed by the then-existent value of the function. Function reference equation 146 can represent this equation where "f(x,p)" now means the word or symbol identifying the function, and "f(x,$p_v$)" correspondingly means the then-existent value of the function. When the measurement is completed, equation 146 is again automatically updated to appear as "f(x,p)=f(x,$p_f$)" where "f(x,$p_f$)" now means the final value of function f(x,p).

Item 150 on viewing screen 108 represents an exemplary general feature of a scene whose image is being collected by image-gathering component 106 in frames. The scene normally has various other features which, to simplify the illustration, are not shown in FIG. 5. The portion of general scene feature 150 appearing in FIG. 5 consists of three straight lines and a curved line. Item 152, enclosed by a pair of dotted lines, is an exemplary general first location in the scene. General first scene location 152 is formed by part of the curved line of scene feature 150. Item 154, likewise enclosed by a pair of dotted lines, is an exemplary general second location in the scene. General second scene location 154 is formed by parts of two of the straight lines of scene feature 150. Item 156 indicates a point where the two straight parts of second scene location 154 meet. Scene locations 152 and 154 of scene feature 150 have a general scene characteristic whose value is to be approximately determined using the general measurement procedure of the invention.

Returning to reference icons 136 and 138, the purpose of shaping icons 136 and 138 as shown in FIG. 5 is to illustrate the general nature of the characteristics that they can have. Reference icons 136 and 138 are not intended to be viewed as having any specific adjustable reference characteristic which is controlled with substantially only a single adjustable parameter and which is to be matched to a characteristic of the scene appearing on viewing screen 108 by adjusting the adjustable parameter so that the final adjusted value of adjustable parameter is approximately the value of the scene characteristic or is insertable into a function that approximately yields the value of the scene characteristic.

An example of the scene characteristic to be measured for scene feature 150 in FIG. 5 could, nevertheless, be some function of the angle between the two straight parts of second scene location 154 relative to a scene location, i.e., scene location 152 here, having a shape that matches the shape of first reference icon 136 subject to the icon shape limitations described later in this paragraph. The adjustable reference characteristic could be the same function in terms of the angle between the two legs of second reference icon 138 relative to the shape of first reference icon 136 with adjustable parameter p being the angle between the two legs of second reference icon 138. First reference icon 136 could have a fixed shape or a shape that varies only with adjustable parameter p. In either case, the adjustable reference characteristic provided by reference icons 136 and 138 would be controlled substantially only with adjustable parameter p.

C. General Operation of Inventive Measurement Device

Figure 6:
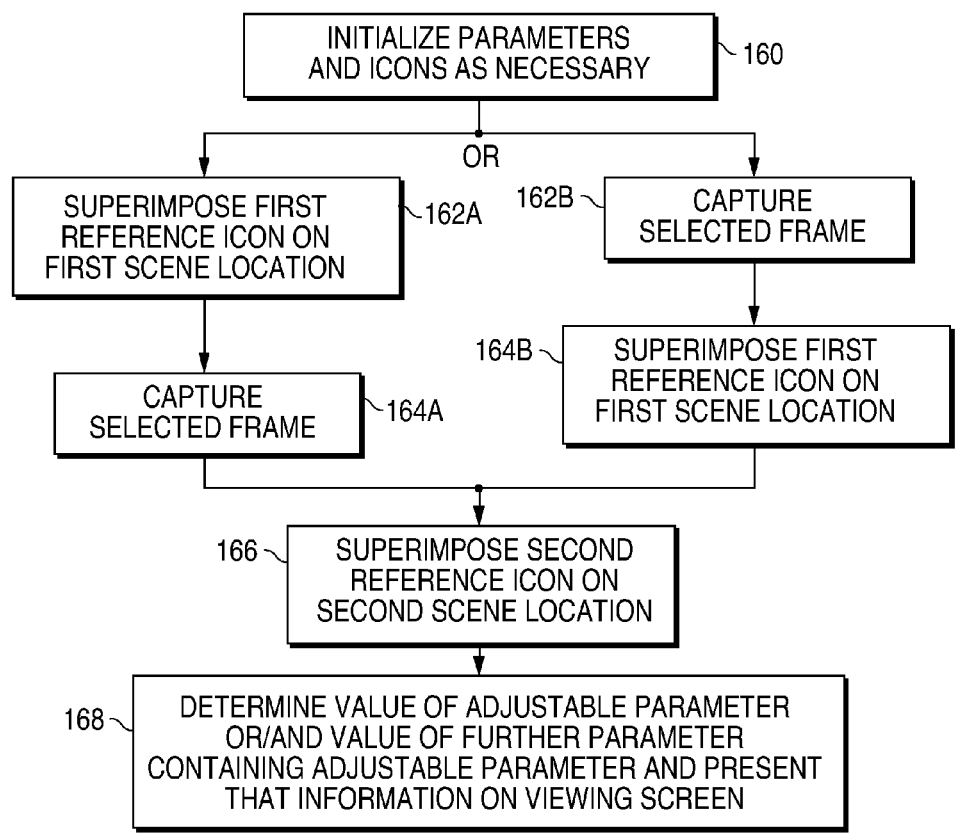
FIG. 6 is a flow chart illustrating the basic measurement operation of the information-presentation device of FIG. 5.

FIG. 6 presents a flow chart illustrating how information-presentation device 100 generally operates in performing a measurement according to the invention. FIGS. 7a-7e illustrate changes in the appearance of viewing screen 108 as the inventive measurement operation proceeds. As shown in FIG. 7a, screen 108 presents a scene in which scene feature 150 appears.

The first step 160 in FIG. 6 is to initialize any item(s) requiring initialization by having a user of information-presentation device 100 bring an instructing object largely into contact with the portion of the SA input structure adjacent to initialization global control icon 132 so as to supply control system 122 with external instruction that causes each such item to be initialized. Referring to FIG. 7a, adjustable parameter p in parameter reference equation 144 is thereby set at an initial parameter value $p_i$. This causes reference equation 144 to initially appear as "p=$p_i$".

When the exemplary scene characteristic defined by scene locations 152 and 154 of scene feature 150 are describable in terms of function f(x,p) of adjustable parameter p, the value of adjustable parameter p in function f(x,p) of function reference equation 146 is also set at initial parameter value $p_i$ so that equation 146 initially appears as "f(x,p)=f(x,$p_i$)". In the above-mentioned example where the item undergoing measurement is describable in terms of a parabolic function having an axis of symmetry in the column direction of viewing screen 108, equation 146 could thus initially appear as f(x,p)=$p_i x^2$ or as y=$p_i x^2$. When the value of an item undergoing measurement is approximately the value of function f(x,p) of adjustable parameter p, equation 146 could likewise initially appear as "f(x,p)=f(x,$p_i$)" where "f(x,$p_i$)" here means the initial value of function f(x,p). Reference icons 136 and 138 also undergo any necessary initialization. In the viewing screen changes presented in FIGS. 7a-7e, reference icons 136 and 138 move (as necessary) toward the left-hand side of screen 108 and adopt the orientations shown in FIG. 7a.

If scene feature 150 does not appear on viewing screen 108 at a location suitable and convenient for performing the measurement, information-presentation device 100 is rotated or/and translated until scene feature 150 appears on screen 108 at a location suitable for making the measurement and preferably convenient for making the measurement. In the example of FIG. 7a, part of first scene location 152 does not appear on screen 108. Accordingly, device 100 is rotated or/and translated until, as shown in FIG. 7b, scene locations 152 and 154 fully appear on screen 108 at screen locations suitable and convenient for performing the measurement.

The objective of the next two steps is to reach a situation, illustrated by FIG. 7c, in which first reference icon 136 is approximately superimposed on first scene location 152 in a captured frame of an image of the scene. This objective can generally be achieved according to either of two routes referred to here as the superimpose-first route and the capture-first route.

In the superimpose-first route, first reference icon 136 is first approximately superimposed on first scene location 152 as indicated by step 162A in FIG. 6. This superimposition action typically involves having the user of information-presentation device 100 translate or/and rotate it so as to cause first scene location 152 to move on screen 108. Depending on where first reference icon 136 is initially located, appropriately translating or/and rotating device 100 may be sufficient to enable icon 136 to be approximately superimposed on first scene location 152.

Control system 122 may additionally or alternatively be supplied with external instruction so that first reference icon 136 moves on viewing screen 108. Depending on the function to be performed by first reference icon 136, the movement capability of icon 136 consists of either or both of translation and rotation. If first reference icon 136 only has translation capability, the external instruction in the superimpose-first route is typically supplied by a procedure in which the user brings an instructing object largely into contact with the portion of the SA input structure adjacent to first reference icon 136 and then translates the instructing object over screen 108 and the SA input structure while maintaining the instructing object largely in contact with the SA input structure such that icon 136 translates (is dragged) as necessary.

First reference icon 136 may have rotation capability, e.g., for situations in which icon 136 is initially at an unsuitable orientation on screen 108 for performing the measurement operation of FIGS. 7a-7e in the superimpose-first route. Rotation of first reference icon 136 requires that it be of such a nature that rotation of icon 136 can be visibly discerned. Assuming that this requirement is met, first reference icon 136 may have a designated point, referred to here as the rotation point (not present in the version of icon 136 shown in FIG. 5), about which icon 136 can be rotated. The external instruction for causing first reference icon 136 to rotate about the rotation point is typically supplied by a procedure in which the user brings an instructing object largely into contact with an SA input location point adjacent to a selected point on icon 136 and spaced apart from the SA location point adjacent to the rotation point and translates the instructing object over screen 108 and the SA input structure, while maintaining the instructing object largely in contact with the SA input structure, to an SA input location point adjacent to a screen point spaced apart from icon 136 prior to the movement. First reference icon 136 then rotates about the rotation point until icon 136 is situated over the screen point.

When first reference icon 136 is capable of being rotated about such a designated rotation point, the external instruction for causing icon 136 to translate in the superimpose-first route is typically supplied by a procedure in which the user brings an instructing object largely into contact with the SA input location point adjacent to the rotation point of icon 136 and then translates the instructing object over screen 108 and the SA input structure, while maintaining the instructing object largely in contact with the SA input structure, to an SA input location point adjacent to a screen point spaced apart from icon 136 prior to the movement such that icon 136 translates (is dragged) as necessary so as to be situated over the screen point.

Again assuming that first reference icon 136 is of such a nature that rotation of icon 136 can be visibly discerned, rotation of icon 136 in the superimpose-first route can alternatively be achieved by causing two separate designated points (not present in the version of icon 136 shown in FIG. 5) located at fixed positions on icon 136 to translate in a suitable manner. For instance, first reference icon 136 rotates if the two designated points travel along non-parallel straight lines at constant spacing between the points, along parallel straight lines in opposite directions at constant spacing between the points, or along parallel straight lines at variable spacing between the points. The two points can follow numerous other types of trajectories that enable first reference icon 136 to rotate. First reference icon 136 typically translates in the course of rotating using the two designated points.

First reference icon 136 also normally changes shape when the spacing between the two designated points varies. The external instruction for causing first reference icon 136 to rotate, potentially translate, and potentially change shape using the two designated points in the superimpose-first route is typically supplied by a procedure in which the user brings an instructing object largely into contact with an SA input location point adjacent to each designated point and translates the instructing object over screen 108 and the SA input structure, while maintaining the instructing object largely in contact with the SA input structure, to an SA input location point adjacent to a screen point spaced apart from that designated point prior to the movement. In any event, first reference icon 136 or/and first scene location 152 are appropriately moved until icon 136 is visually approximately situated over scene location 152 in the superimpose-first route.

With first reference icon 136 approximately superimposed on first scene location 152, the user brings an instructing object largely into contact with the portion of the SA input structure adjacent to capture/release control icon 134 so as to supply control system 122 with external instruction that causes a frame of an image of the scene to be captured as indicated by step 164A in FIG. 6. This results in the situation of FIG. 7c in which first reference icon 136 is approximately superimposed on first scene location 152 in the captured frame.

In the capture-first route, the user first brings an instructing object largely into contact with the portion of the SA input structure adjacent to capture/release control icon 134 so as to supply control system 122 with external instruction that causes a frame of an image of the scene to be captured as indicated by step 162B in FIG. 6. Responsive to external instruction, control system 122 then causes first reference icon 136 to be approximately superimposed on first scene location 152 as indicated by step 164B in FIG. 6. This entails moving first reference icon 136 by at least translation and possibly also by rotation. If first reference icon 136 only has translation capability, the external instruction in the capture-first route is typically supplied by a procedure in which the user brings an instructing object largely into contact with the portion of the SA input structure adjacent to first reference icon 136 and then translates the instructing object over screen 108 and the SA input structure, while maintaining the instructing object largely in contact with the SA input structure, such that icon 136 translates (is dragged) over screen 108 until icon 136 is visually approximately situated over first scene location 152.

As in the superimpose-first route, rotation of first reference icon 136 in the capture-first route requires that icon 136 be of such a nature that rotation of icon 136 can be visibly discerned. Again assuming that this requirement is met, first reference icon 136 may again have a designated rotation point (not present in the version of icon 136 shown in FIG. 5) about which icon 136 can be rotated in the capture-first route. Subject to appropriate earlier translation of first reference icon 136 in the captured frame, the external instruction for causing icon 136 to rotate is typically supplied by a procedure in which the user brings an instructing object largely into contact with an SA input location point adjacent to a selected point on icon 136 and spaced apart from the SA location point adjacent to the rotation point of icon 136 and translates the instructing object over screen 108 and the SA input structure, while maintaining the instructing object largely in contact with the SA input structure, to an SA input location point adjacent to a point on first scene location 152. First reference icon 136 then rotates about the rotation point until icon 136 is visually approximately situated over first scene location 152 in the captured frame.

When first reference icon 136 is capable of being rotated about such a designated rotation point, the external instruction for causing icon 136 to translate in the capture-first route is typically supplied by a procedure in which the user brings an instructing object largely into contact with the SA input location point adjacent to the rotation point of icon 136 and translates the instructing object over screen 108 and the SA input structure, while maintaining the instructing object largely in contact with the SA input structure, to an SA input location point adjacent to a selected point on first scene location 152. First reference icon 136 then translates (is dragged) so that the rotation point is approximately situated over the selected point on first scene location 152 in the captured frame.

Once again assuming that first reference icon 136 is of such a nature that rotation of icon 136 can be visibly discerned, rotation of icon 136 in the capture-first route can also be achieved by causing two separate designated points (not present in the version of icon 136 shown in FIG. 5) located at fixed positions on icon 136 to translate in suitable manner as described above in connection with the superimpose-first route. Again, first reference icon 136 typically translates in the course of rotating using the two designated points and normally changes shape when the spacing between the two points varies.

The rotation, potential translation, and potential shape change using the two designated points in the capture-first route may be sufficient to enable first reference icon 136 to be approximately superimposed on first scene location 152 in the captured frame. Assuming that this is indeed the situation and that first scene location 152 has two separate scene points (not present in the version of scene location 152 shown in FIG. 5) corresponding to the designated points of first reference icon 136, the external instruction for causing icon 136 to rotate, potentially translate, and potentially change shape in the capture-first route using the two designated points is typically supplied by a procedure in which the user separately brings an instructing object largely into contact with an SA input location point adjacent to each one of the designated points and translates the instructing object over viewing screen 108 and the SA input structure, while maintaining the instructing object largely in contact with the SA input structure, to an SA input location point adjacent to a different one of the two scene points on first scene location 152. The capture-first route generally results in a more accurate measurement than the superimpose-first route but takes longer to perform than the superimpose-first route.

The approximate superimposition of first reference icon 136 on first scene location 152 does not cause adjustable parameter p to change. Adjustable parameter p is thus still at initial value $p_i$ in the captured frame at the stage of FIG. 7c. Parameter reference equation 144 still appears as "$p=p_i$". Function reference equation 146 similarly still appears as "$f(x,p)=f(x,p_i)$".

Responsive to further external instruction, control system 122 causes second reference icon 138 to be approximately superimposed on second scene location 154 in the captured frame as adjustable parameter p is adjusted to enable the reference characteristic to approximately match the scene characteristic. This further superimposition action, indicated by step 166 in FIG. 6, entails moving second reference icon 138 by at least translation and possibly also by rotation. If second reference icon 138 only has translation capability, the external instruction is typically supplied by a procedure in which the user brings an instructing object largely into contact with the portion of the SA input structure adjacent to second reference icon 138 and then translates the instructing object over screen 108 and the SA input structure, while maintaining the instructing object largely in contact with the SA input structure, such that icon 138 translates (is dragged) over screen 108 until icon 138 is visually approximately situated over second scene location 154 in the captured frame.

Analogous to what was said above about first reference icon 136, rotation of second reference icon 138 requires that it be of such a nature that rotation of icon 138 can be visibly discerned. Assuming that this requirement is met, second reference icon 138 may have a designated point, likewise referred to here as the rotation point (not present in the version of icon 138 shown in FIG. 5), about which icon 138 can be rotated. Subject to appropriate earlier translation of second reference icon 138, the external instruction for causing icon 138 to rotate is typically supplied by a procedure in which the user brings an instructing object largely into contact with an SA input location point adjacent to a selected point on icon 138 and spaced apart from the SA location point adjacent to the rotation point of icon 138 and translates the instructing object over screen 108 and the SA input structure, while maintaining the instructing object largely in contact with the SA input structure, to an SA input location point adjacent to a point on second scene location 154. Second reference icon 138 then rotates about the rotation point until icon 138 is visually approximately situated over second scene location 154 in the captured frame.

When second reference icon 138 is capable of being rotated about such a designated rotation point, the external instruction for causing icon 138 to translate is typically supplied by a procedure in which the user brings an instructing object largely into contact with the SA input location point adjacent to the rotation point of icon 138 and translates the instructing object over screen 108 and the SA input structure, while maintaining the instructing object largely in contact with the SA input structure, to an SA input location point adjacent to a selected point on second scene location 154. Second reference icon 138 then translates so that the rotation point is approximately situated over the selected point on second scene location 154 in the captured frame.

Again assuming that second reference icon 138 is of such a nature that rotation of icon 138 can be visibly discerned, rotation of icon 138 can also be achieved by causing two separate designated points (not present in the version of icon 138 shown in FIG. 5) located at fixed positions on icon 138 to translate in suitable manner as described above in connection with the corresponding rotation of first reference icon 136 using two designated points in the superimpose-first route. Second reference icon 138 typically translates in the course of rotating using the two designated points and normally changes shape when the spacing between the two points varies.

The rotation, potential translation, and potential shape change using the two designated points on second reference icon 138 may be sufficient to enable it to be approximately superimposed on second scene location 154 in the captured frame. Assuming that this situation arises and that first scene location 154 has two separate scene points (not present in the version of scene location 154 shown in FIG. 5) corresponding to the designated points of second reference icon 138, the external instruction for causing icon 138 to rotate, potentially translate, and potentially change shape using the two designated points is typically supplied by a procedure in which the user separately brings an instructing object largely into contact with an SA input location point adjacent to each one of the designated points and translates the instructing object over viewing screen 108 and the SA input structure, while maintaining the instructing object largely in contact with the SA input structure, to an SA input location point adjacent to a different one of the two scene points on second scene location 154.

Second reference icon 138 changes shape in the general exemplary measurement operation illustrated in FIGS. 7a-7e where second reference icon 138 includes reference control icon 140 centered on reference point 142. The movement of second reference icon 138 in the exemplary measurement operation of FIGS. 7a-7e requires translation but, due to the way in which icon 138 changes shape, no actual rotation.

To accomplish the translation and shape change, the superimposition of second reference icon 138 on second scene location 154 in the captured frame specifically entails first providing control system 122 with external instruction that causes reference point 142 to be approximately superimposed on scene point 156 where the two straight parts of second scene location 154 meet. See FIG. 7d. This external instruction is typically supplied by a procedure in which the user brings an instructing object largely into contact with the portion of the SA input structure adjacent to reference control icon 140 and then translates the instructing object over viewing screen 108 and the SA input structure, while maintaining the instructing object largely in contact with the SA input structure, such that icon 140 translates (is dragged) over screen 108 until icon 140 is visually approximately situated on scene point 156. Reference point 142 is thereby approximately superimposed on scene point 156 in the captured frame.

The approximate superimposition of reference point 142 on scene point 152 in the general exemplary measurement operation of FIGS. 7a-7e does not cause adjustable parameter p to change. Hence, adjustable parameter p is still at initial value $p_i$ in the captured frame at the stage of FIG. 7d. Parameter reference equation 144 continues to appear as "$p=p_i$". Function reference equation 146 similarly continues to appear as "$f(x,p)=f(x,p_i)$".

Control system 122 is subsequently supplied with external instruction that causes the two legs of second reference icon 138 to rotate so that they are respectively approximately superimposed on the two straight parts of second scene location 154 as shown in FIG. 7e. In so doing, second reference icon 138 changes shape. The external instruction for this shape change is typically supplied by a procedure in which the user (i) brings an instructing object largely into contact with an SA input location point adjacent to a point, spaced apart from reference point 142, on a selected one of the legs of second reference icon 138 and translates the instructing object over viewing screen 108 and the SA input structure, while maintaining the instructing object largely in contact with the SA input structure, to an SA input location point adjacent to a point on a selected one of the two straight parts of second scene location 154 such that the selected leg of icon 138 rotates about reference point 142 until the selected leg of icon 138 is visually approximately situated over the selected straight part of second scene location 154 in the captured frame and (ii) brings an instructing object largely into contact with an SA input location point adjacent to a point, spaced apart from reference point 142, on the remaining one of the legs of second reference icon 138 and translates the instructing object over viewing screen 108 and the SA input structure, while maintaining the instructing object largely in contact with the SA input structure, to an SA input location point adjacent to a point on the remaining one of the two straight parts of second scene location 154 such that the remaining leg of icon 138 rotates about reference point 142 until the remaining leg of icon 138 is visually approximately situated over the remaining straight part of second scene location 154 in the captured frame.

Reference icons 136 and 138 are, as mentioned above, related to each other in such a way that their reference characteristic is controlled with substantially only adjustable parameter p. With reference icons 136 and 138 respectively approximately superimposed on scene locations 152 and 154 in the captured frame, the reference characteristic in the captured frame approximately matches the scene characteristic. Adjustable parameter p changes from initial value $p_i$ to final value $p_f$ in going from the stage of FIG. 7d to the stage of FIG. 7e in which second reference icon 138 is approximately superimposed on second scene location 154. Final parameter value $p_f$ corresponds to the reference characteristic in the captured frame and thus to the scene characteristic being measured. Information-presentation device 100 determines final parameter value $p_f$.

If the value of an item undergoing measurement is approximately the value of adjustable parameter p for a corresponding specific relationship between reference icons 136 and 138, final parameter value $p_f$ is approximately the value of the scene characteristic. As depicted in FIG. 7e, parameter reference equation 144 on viewing screen 108 is then automatically updated to appear as "$p=p_f$".

If an item undergoing measurement is describable in terms of function f(x,p) of adjustable parameter p, function reference equation 146 on viewing screen 108 is automatically updated to appear as "$f(x,p)=f(x,p_f)$" in FIG. 7e where final parameter value $p_f$ explicitly appears in function $f(x,p_f)$. For example, if an item undergoing measurement is describable in terms of a parabolic function having an axis of symmetry in the column direction of screen 108, reference equation 146 could generally be updated to appear as $f(x,p)=p_f x^2$ or as $y=p_f x^2$.

If the value of an item undergoing measurement is approximately the value of function f(x,p) of adjustable parameter p for a corresponding specific relationship between reference icons 136 and 138, information-presentation device 100 determines the resultant (final) function value $f(x,p_f)$ as approximately the value of the scene characteristic. Function reference equation 146 is then automatically updated to appear as "$f(x,p)=f(x,p_f)$" where "$f(x,p_f)$" now means the final value of function f(x,p).

Adjustable parameter p normally undergoes a sequence of time-wise intermediate values, continuously determined by information-presentation device 100, in changing from initial value $p_i$ to final value $p_f$ as second reference icon 138 undergoes the process of being approximately superimposed on second scene location 154. Parameter reference equation 144 normally continuously presents the timewise intermediate values of parameter p. As parameter p is changing from initial value $p_i$ to final value $p_f$, equation 144 thereby normally undergoes continuous changing so as to instantaneously appear as "$p=p_v$" where $p_v$ represents the changing instantaneous value of parameter p.

Information-presentation device 100 also determines the corresponding time-wise intermediate values of parameter function f(x,p). Function reference equation 146 normally continuously presents the timewise intermediate values of parameter function f(x,p). That is, as parameter p is changing from initial value $p_i$ to final value $p_f$, equation 146 normally undergoes continuous changing so as to instantaneously appear as "f(x,p)=f(x,$p_v$)" where (a) instantaneous parameter value $p_v$ explicitly appears in function "f(x,$p_v$)" if an item undergoing measurement is describable in terms of function f(x,p) or (b) "f(x,$p_v$)" means the instantaneous value of function f(x,p) if the value of the item undergoing measurement is approximately the value of function f(x,p).

The following three sections describe embodiments of information-presentation device 100 for performing angle measurement, distance measurement, and curvature measurement. In these three sections, the external instructions supplied to control system 122 are, for simplicity, often described in terms of the actions which produce those external instructions, e.g., the use of an instructing object, without explicitly referring to external instructions in connections with those actions. It is, nevertheless, implicit in the description of the angle-measurement, distance-measurement, and curvature-measurement embodiments that these actions produce external instructions supplied to control system 122.

Additionally, the SA input structure along viewing screen 108 is, also for simplicity, generally not mentioned in the descriptions of the angle measurement, distance measurement, and curvature measurement and in the later material. Instead, an action which produces the external instruction supplied by an instructing object to the SA input structure is described in terms of bringing the instructing object largely into contact with a position on screen 108 and, as appropriate, moving the instructing object over screen 108 to another position on screen 108. Since the SA input structure is adjacent to screen 108, bringing the instructing object largely into contact with a position on screen 108 and, as appropriate, moving the instructing object over screen 108 to another position on screen 108 results in the instructing object being brought largely into contact with the portion of the SA input structure adjacent to the first-mentioned position on screen 108 and, as appropriate, being moved over screen 108 and the SA input structure to be largely in contact with the portion of the SA input structure adjacent to the second-mentioned position on screen 108.

D. Angle Measurement

A first embodiment of information-presentation device 100 is directed to angle measurement. FIGS. 8a-8e illustrate changes in the appearance of viewing screen 108 in the angle-measurement embodiment of device 100 as the measurement operation proceeds. General scene feature 150 is replaced here with a scene feature 150A having an angle $\alpha_x$ to be measured. See FIG. 8a. Scene angle $\alpha_x$ is defined between a first scene line 152A and a second scene line 154A that respectively implement first scene location 152 and second scene location 154 in general scene feature 150.

Scene lines 152A and 154A in scene feature 150A here together terminate at a scene vertex point 170 and therefore actually meet at scene vertex point 170. Vertex point 170 may be situated at an intermediate location, i.e., away from the ends, of either or both of scene lines 152A and 154A so that one of scene lines 152A and 152 meets the other between its ends or so that they cross each other. In that case, scene lines 152A and 154A still actually meet at vertex point 170.

One or both of scene lines 152A and 154A may terminate before reaching scene vertex point 170. If one of scene lines 152A and 154A terminates before reaching vertex point 170, a suitable imaginary extension of that line 152A or 154A meets the other line 154A or 152A at point 170. If both of scene lines 152A and 154A terminate before reaching vertex point 170, suitable imaginary extensions of both of lines 152A or 154A meet at point 170.

Scene lines 152A and 154A are depicted as being substantially straight in FIGS. 8a-8e. However, one or both of scene lines 152A and 154A may be somewhat curved. Scene angle $\alpha_x$ can then be defined as the angle between tangents to scene lines 152A and 154A at scene vertex point 170. Alternatively, scene angle $\alpha_x$ can be defined as the angle between first scene line 152A, or a straight-line approximation to line 152A if it is materially curved, and second scene line 154A, or a straight-line approximation to line 154A if it is materially curved. The choice of which of these definitions to use for angle $\alpha_x$ in the curved-line situation is at the user's discretion. In any event, the curved-line situation and the various potential terminations of scene lines 152A and 154A relative to vertex point 170 are accommodated by the specification that first scene line 152A, or a straight-line approximation to line 152A if it is materially curved, and second scene line 154A, or a straight-line approximation to line 154A if it is materially curved, meet actually or by imaginary extension at point 170.

General first reference icon 136 is implemented with a substantially straight first reference line 136A in the angle-measurement embodiment. General second reference icon 138 is similarly implemented with a substantially straight second reference line 138A in the angle-measurement embodiment. Reference lines 136A and 138A are angled relative to each other and intersect at a reference vertex point 172. Second reference line 138A is at an adjustable reference angle $\alpha_{adj}$ to first reference line 136A.

Reference vertex point 172 is illustrated as a somewhat large dot in each of FIGS. 8a-8d for location clarity. However, reference vertex point 172 simply represents a point location and thus need not actually be visible, especially since vertex point 172 is located at the intersection of reference lines 136A and 138A. In fact, reference vertex point 172 need only be trackable in computer 104.

First reference line 136A preferably fixedly extends in the row or column direction, i.e., parallel or perpendicular to the top or bottom of viewing screen 108, during the entire angle-measurement operation and thus is not capable of being rotated. Orienting reference line 136A to fixedly extend in the row or column direction facilitates use of the angle-measurement embodiment and normally results in somewhat simpler measurement computations. FIGS. 8a-8e illustrate the exemplary preferred situation in which reference line 136A fixedly extends in the row direction. Nevertheless, reference line 136A can fixedly extend at non-zero angles to the row and column directions, i.e., at an angle between 0° and 90° to the row or column direction. Reference line 136A can also be rotatable.

General adjustable parameter p is normally implemented with adjustable reference angle $\alpha_{adj}$ between reference lines 136A and 138A in the angle-measurement embodiment. Information-presentation device 100 employs a computer algorithm provided in computer 104 to determine the value of adjustable angle $\alpha_{adj}$ at any time. The computer algorithm, an inverse trigonometric algorithm, preferably determines the instantaneous value of adjustable angle $\alpha_{adj}$ in radians as the inverse tangent of the ratio of the distance in normalized linear screen units from a further point, spaced apart from reference vertex point 172, on first reference line 136A to second reference line 138A along a perpendicular to first reference line 136A to (ii) the distance in normalized linear screen units from the further point to reference vertex point 172. Alternatively, the computer algorithm determines the instantaneous value of adjustable angle $\alpha_{adj}$ in radians as the inverse cotangent of the inverse ratio of these two distances.

Viewing screen 108 normally includes a units specification icon (not shown) by which the user is able to instruct computer 104 to have the inverse trigonometric computer algorithm convert the $\alpha_{adj}$ value in radians to the corresponding $\alpha_{adj}$ value in degrees. Computer 104 normally causes the conversion to be performed only when so instructed. The units specification icon is addressed by bringing an instructing object largely into contact with the icon. This causes the units specification icon to present a menu, e.g., a drop-down menu, from which the user is able to select radians or degrees by bringing an instructing object largely into contact with a suitable radians or degrees portion of the menu. As long information-presentation device 100 is in a condition to perform a distance-measurement operation according to the invention, the user can address the units specification icon at any time during or after the distance-measurement operation.

Figure 8A:
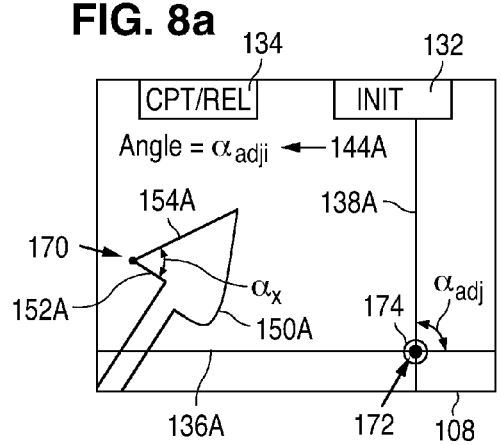
FIGS. 8a, 8b, 8c, 8d, and 8e are front views of the viewing screen in an embodiment of the information-presentation device of FIG. 5 during measurement of an angle.

FIG. 8a illustrates an exemplary starting condition for the angle measurement upon initialization of any item(s) requiring initialization. Adjustable reference angle $\alpha_{adji}$ is set at an initial value $\alpha_{adji}$. Second reference line 138A initially extends perpendicular to first reference line 136A in the exemplary initialization screen view shown in FIG. 8a so that initial adjustable angle value $\alpha_{adji}$ is 90°. Since first reference line 136A fixedly extends in the row direction here, second reference line 138A initially extends in the column direction. While 90° for initial angle value $\alpha_{adji}$ is convenient from a user perspective, initial value $\alpha_{adji}$ can be any other value between 0° and 180°.

General adjustable parameter reference equation 144 on viewing screen 108 is implemented with an adjustable angle reference equation 144A in the angle-measurement embodiment. For exemplary purposes, adjustable angle reference equation 144A appears on screen 108 as "Angle=" followed by the then-existent value of adjustable reference angle $\alpha_{adj}$ in degrees. At the initialization stage of FIG. 8a, reference equation 144A appears as "Angle=$\alpha_{adji}$" where initial adjustable angle value $\alpha_{adji}$ is 90° for the exemplary initial condition in which reference lines 136A and 138A extend perpendicular to each other.

A vertex reference control icon 174, typically circular, is generally centered on reference vertex point 172 and is thereby shared by reference lines 136A and 138A. Vertex reference control icon 174 is translated over viewing screen 108 by bringing an instructing object largely into contact with icon 174 and then translating the object over screen 108. This causes first reference line 136A or/and second reference line 138A to translate (be dragged) correspondingly so that control icon 174 remains centered on reference vertex point 172. Reference line 138A is rotated about reference vertex point 172 by bringing an instructing object largely into contact with a point, spaced apart from vertex point 172, on second reference line 138A and translating the object over screen 108 in a direction away from the previous location of line 138A.

Angle measurement is performed in the following way. Referring to the initialization screen view of FIG. 8a, the user instructs initialization control icon 132 to cause each item requiring initialization to be initialized. The initialization instruction is provided by bringing an instructing object largely into contact with initialization icon 132. Adjustable angle reference equation 144A is thereby placed in the above-described initial form. First reference line 136A is initialized to a location near the bottom of viewing screen 108. Second reference line 138A is initialized to a location near the right-hand side of screen 108.

Scene feature 150A is close to the left-hand edge of viewing screen 108 in the exemplary starting condition with first scene line 152A extending at a non-zero angle to, i.e., non-parallel to, first reference line 136A. This location of scene feature 150A is inconvenient for performing the angle measurement. Accordingly, the user typically rotates or/and translates information-presentation device 100 to bring scene feature 150A closer to the center of screen 108 as indicated in FIG. 8b.

Figure 8B:
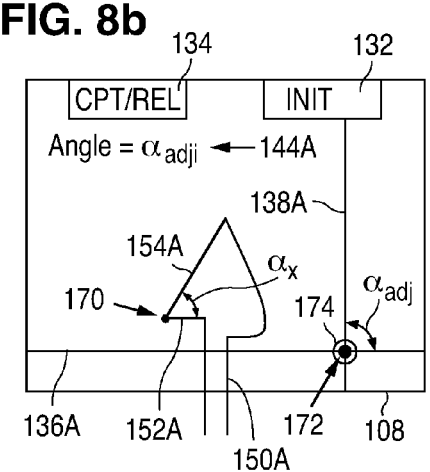
Figure 8C:
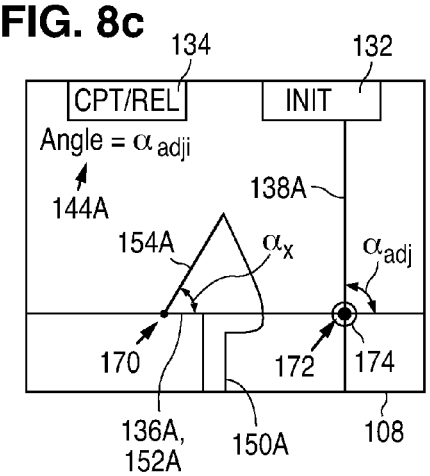

The purpose of the next two steps is to reach a situation, illustrated by FIG. 8c, in which first reference line 136A is approximately superimposed on first scene line 152A in a captured frame of an image of the scene with scene feature 150A close to the center of viewing screen 108.

In the superimpose-first route, the user further rotates or/and translates information-presentation device 100 until first reference line 136A is approximately superimposed on first scene line 152A as shown in FIG. 8c. This may entail rotating device 100 until first scene line 152A extends largely parallel to first reference line 136A as shown in FIG. 8b and then translating device 100 to obtain the superimposition condition of FIG. 8c. Alternatively, device 100 may be rotated or/and translated until first scene line 152A crosses first reference line 136A after which device 100 is rotated appropriately to obtain the superimposition condition of FIG. 8c. In any event, after causing first reference line 136A to be approximately superimposed on first scene line 152A, the user instructs capture/release control icon 134 to cause a frame of an image of that scene to be captured. The frame-capture instruction is supplied by bringing an instructing object largely into contact with capture/release icon 134.

In the capture-first route, the user instructs capture/release control icon 134 to cause a frame of an image of the scene to be captured with scene feature 150A close to the center of viewing screen 108 as indicated in FIG. 8b. The frame-capture instruction is supplied by bringing an instructing object largely into contact with capture/release icon 132. In moving scene feature 150A close to the center of screen 108 prior to frame capture, the user may have caused first scene line 152A to extend largely parallel to first reference line 136A as also depicted in FIG. 8b. If so, subsequent to frame capture, the user causes first reference line 136A to translate in the captured frame until line 136A is approximately superimposed on first scene line 152A. The translation action is normally achieved by bringing an instructing object largely into contact with vertex reference control icon 174 and translating (dragging) it over viewing screen 108 with the object until control icon 174 is visually approximately situated over a point on first scene line 152A or on an imaginary extension of first scene line 152A. Since first reference line 136A translates (is dragged) correspondingly with control icon 174, first reference icon 136A is thereby approximately superimposed on first scene line 152A as shown in FIG. 8c.

If, in the capture-first route, first reference line 136A extends at a non-zero angle to first scene line 152A in the captured frame, the user typically first arranges for reference vertex point 172 to be approximately superimposed on a point on line 152A or on an imaginary extension of line 152A. This action is achieved by bringing an instructing object largely into contact with vertex reference control icon 174 and translating (dragging) it with the object until control icon 174 is visually approximately situated over a point on first scene line 152A or on an imaginary extension of line 152A such that reference vertex point 172 is approximately superimposed on that point on line 152A or on the imaginary extension of line 152A.

The user then causes first reference line 136A to rotate until it is approximately superimposed on first scene line 152A. The rotation is achieved by bringing an instructing object largely into contact with a point, spaced apart from reference vertex point 172, on first reference line 136A and translating the object over viewing screen 108 until the object is visually approximately situated over an additional point on first scene line 152A. This action causes first reference line 136A to rotate about vertex point 172 until line 136A passes through the additional point on first scene line 152A. First reference line 136A is thereby approximately superimposed on first scene line 152A.

The approximate superimposition of first reference line 136A on first scene line 152A does not cause adjustable reference angle $\alpha_{adj}$ to change. Adjustable angle $\alpha_{adj}$ is therefore still at initial value angle $\alpha_{adji}$ in the captured frame at the stage of FIG. 8c. Adjustable angle reference equation 144A still appears as "Angle=$\alpha_{adji}$" where initial value $\alpha_{adji}$ is specifically 90° in the exemplary measurement operation of FIGS. 8a-8e.

Figure 8D:
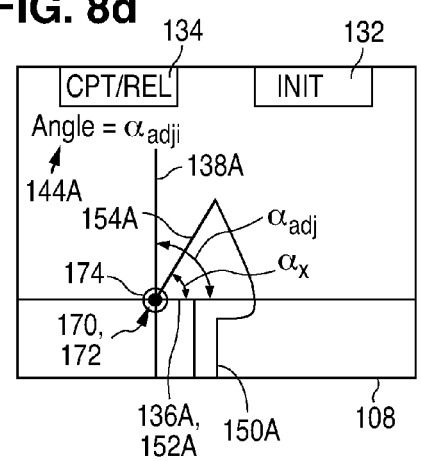

With the captured frame having first reference line 136A approximately superimposed on first scene line 152A according to the superimpose-first or capture-first route, the user causes vertex reference control icon 174 to translate in the captured frame until control icon 174 is approximately superimposed on scene vertex point 170. This causes second reference line 138A to translate (be dragged) correspondingly so that icon 174 remains centered on reference vertex point 172. Consequently, reference vertex point 172 is approximately superimposed on scene vertex point 170 in the captured frame with second reference line 138A passing through reference vertex point 172 as indicated in FIG. 8d. The translation is normally achieved by bringing an instructing object largely into contact with control icon 174 and translating (dragging) it over viewing screen 108 with the object until icon 174 is visually approximately situated over scene vertex point 170.

Second reference line 138A, although having undergone translation, is still at the initial angular orientation to first reference line 136A at this stage in the exemplary angle measurement operation of FIGS. 8a-8e, i.e., second reference line is still perpendicular to first reference line 136A as shown in FIG. 8d. Accordingly, adjustable reference angle $\alpha_{adj}$ is still at initial value $\alpha_{adji}$. Adjustable angle reference equation 144A continues to be presented as "Angle=$\alpha_{adji}$".

Figure 8E:
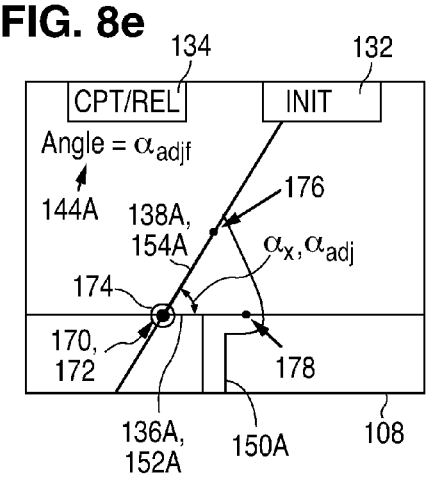

The user now causes second reference line 138A to rotate about reference vertex point 172 in the captured frame until line 138A is approximately superimposed on second scene line 154A as shown in FIG. 8e. The rotation is normally achieved by bringing an instructing object largely into contact with a point, spaced apart from vertex point 172, on second reference line 138A and translating the object over viewing screen 108 until the object is visually approximately situated over an additional point on second scene line 154A. This action causes second reference line 138A to rotate about vertex point 172 until line 138A passes through the additional point on second scene line 154A. Item 176 in FIG. 8e indicates a suitable example of the additional point on second scene line 154A. Second reference line 138A is thereby approximately superimposed on second scene line 154A in the captured frame while first reference line 136A remains approximately superimposed on first scene line 152A.

The rotation of second reference line 138A about reference vertex point 172 so that reference lines 136A and 138A are respectively approximately superimposed on scene lines 152A and 154A in the captured frame causes adjustable reference angle $\alpha_{adj}$ to change from initial value $\alpha_{adji}$ to a final value $\alpha_{adjf}$ that approximately equals scene angle $\alpha_x$ being measured. Information-presentation device 100 employs a selected one of the above-mentioned inverse trigonometric computer algorithms, preferably the inverse tangent algorithm but alternatively the inverse cotangent algorithm, to determine final adjustable angle value $\alpha_{adjf}$ in the captured frame. The distances used in the selected inverse trigonometric computer algorithm are those in the captured frame. Item 178 in FIG. 8e indicates a suitable example of the further point located on first reference line 136A, spaced apart from reference vertex point 172, and used in the selected inverse trigonometric computer algorithm for determining final adjustable angle value $\alpha_{adjf}$. The computer algorithm normally converts final angle value $\alpha_{adjf}$ in radians to degrees to provide the approximate measured value of scene angle $\alpha_x$ in degrees.

Adjustable angle $\alpha_{adj}$ normally goes through a sequence of time-wise intermediate values, continuously determined by information-presentation device 100 using the selected inverse trigonometric computer algorithm, in changing from initial value $\alpha_{adji}$ to final value $\alpha_{adjf}$ as second reference line 138A undergoes the process of being approximately superimposed on second scene line 154A. Adjustable angle reference equation 144A normally continuously presents the timewise intermediate values of adjustable angle $\alpha_{adj}$. As adjustable angle $\alpha_{adj}$ is changing from initial value $\alpha_{adji}$ to final value $\alpha_{adjf}$, equation 144A thus normally undergoes continuous changing so as to instantaneously appear as "Angle=$\alpha_{adjv}$" where $\alpha_{adjv}$ represents the changing instantaneous value of angle $\alpha_{adj}$.

As indicated in FIG. 8e, adjustable angle reference equation 144A finally changes to "Angle=$\alpha_{adjf}$" where final reference angle value $\alpha_{adjf}$, the approximate value of scene angle $\alpha_x$, is a number normally in degrees. This completes the angle measurement.

E. Distance Measurement

Figure 9A:
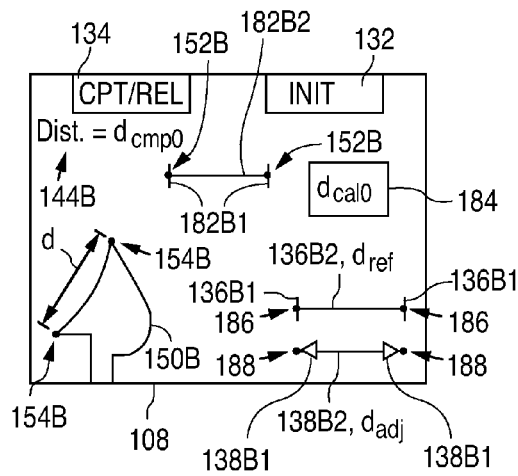
FIGS. 9a, 9b, 9c, and 9d are front views of the viewing screen in an embodiment of the information-presentation device of FIG. 5 during measurement of a distance.

A second embodiment of information-presentation device 100 is directed to distance measurement. FIGS. 9a-9d illustrate changes in the appearance of viewing screen 108 in the distance-measurement embodiment of device 100 as the measurement operation proceeds. Referring to FIG. 9a, general scene feature 150 is replaced here with a scene feature 150B having a selected distance d to be measured. Selected distance d extends between a pair of distance end points 154B that together implement second scene location 154 in general scene feature 150. For location clarity, distance end points 154B of scene feature 150B are illustrated as somewhat large dots in FIG. 9a. However, distance end points 154B simply represent point locations whose separation distance d is under measurement and therefore need not actually be visible as long as their locations can be clearly established by the user.

First scene location 152 is implemented with a pair of calibration end points 152B separated by a screen distance representing a calibration distance $d_{cal}$ in the distance-measurement embodiment. Calibration distance $d_{cal}$ is a distance whose dimensional numerical value is entered into information-presentation device 100 in response to human instruction and thus is known, typically to at least the user. The screen distance representing dimensional calibration distance $d_{cal}$ is shown as extending in the row direction of viewing screen 108 (horizontally in FIGS. 9a-9d) but can extend in the column direction or in any other direction on screen 108.

Calibration end points 152B, illustrated as somewhat large dots in FIGS. 9a-9d for location clarity, can be established in various ways. As one example, calibration end points 152B consist of two visually discernable points whose separation distance $d_{cal}$ has been determined prior to performing the distance measurement. As another example, calibration end points 152B are simply a pair of distance markings, e.g., the two most distant distance markings, on a ruler or similar mechanical measuring implement placed at a suitable location in the scene. Calibration end points 152B need not actually be visible as long as their locations can be clearly established and tracked in computer 104.

A pair of optional calibration end-point icons 182B1 respectively demarcate calibration end points 152B in the exemplary distance measurement operation of FIGS. 9a-9d. Each calibration end-point icon 182B1 consists of a short straight line extending perpendicular to the direction of (the screen distance representing) calibration distance $d_{cal}$. The two icon lines are respectively largely centered on calibration end points 152B at least in the direction of calibration distance $d_{cal}$. In addition, an optional straight calibration line 182B2 extends between calibration end points 152B and thus between calibration end-point icons 182B1 to form a composite calibration icon 182B1/182B2 denoted for simplicity as calibration icon "182B". Calibration line 182B2 thereby extends in the direction of calibration distance $d_{cal}$.

Use of calibration icon 182B often facilitates distance measurement according to the invention. For instance, calibration icon 182B can help establish the specific locations of calibration end points 152B if they are difficult to clearly visibly discern. Nevertheless, distances can often readily be measured using the distance-measurement embodiment of information-presentation device 100 even though calibration line 182B2 or/and calibration end-point icons 182B1 are absent. For instance, neither of the above-mentioned examples of ways to establish calibration end points 152B employs calibration icon 182B.

An examination of FIGS. 9a-9d shows that calibration end points 152B and calibration icon 182B move in the scene displayed on viewing screen 108 in general synchronism with the movement of the other scene features, including distance end points 154B, in the exemplary distance-measurement operation of FIGS. 9a-9d. However, calibration end points 152B and calibration icon 182B can be at a fixed location on screen 108 as may be desirable when multiple measurements are to be made in scenes where the pairs of distance end points respectively implemented with distance end points 154B are at largely the same distance from information-presentation device 100. Placement of calibration end points 152B and calibration icon 182B at a fixed screen location is achieved by programming computer 104 to impose calibration end points 152B and calibration icon 182B on screen 108.

A rectangular calibration box 184 suitable for receiving the numerical value of calibration distance $d_{cal}$ is situated at a convenient location on viewing screen 108. Calibration box 184, located below initialization icon 132 in the exemplary screen views of FIGS. 9a-9d, presents an arbitrary value $d_{cal0}$, such as 1, in FIG. 9a because the actual numerical value of calibration distance $d_{cal}$ has not been entered into box 184 at the stage of FIG. 9a. Alternatively, calibration box 184 is empty at the stage of FIG. 9a so that calibration distance $d_{cal}$ is effectively zero at that stage.

Figure 9B:
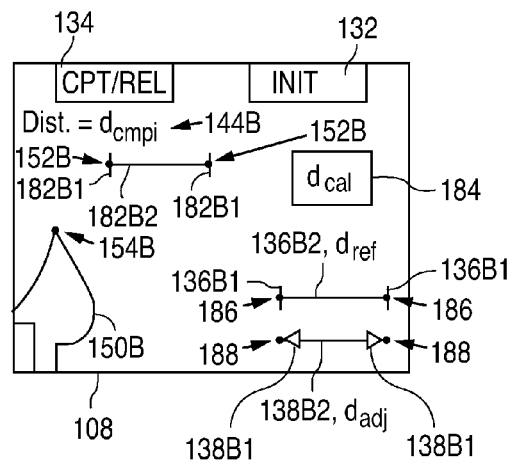

General first reference icon 136 is implemented with a pair of first reference end-point icons 136B1 in the distance-measurement embodiment. First reference end-point icons 136B1 demarcate a pair of first reference end points 186 separated by a reference distance $d_{ref}$ given in (non-dimensional) normalized linear screen units. While FIGS. 9a and 9b depict non-dimensional reference distance $d_{ref}$ as extending in the row direction of viewing screen 108, reference distance $d_{ref}$ can extend in the column direction or in any other direction on screen 108.

Each first reference end-point icon 136B1 is formed with a short straight line extending perpendicular to the direction of reference distance $d_{ref}$. The two icon lines are respectively largely centered on first reference end points 186 at least in the direction of reference distance $d_{ref}$. A straight first reference line 136B2 extends between first reference end points 186 and therefore between first reference end-point icons 136B1 to form a composite first reference icon 136B1/136B2 denoted for simplicity as first reference icon "136B". As a result, first reference line 136B2 extends in the direction of reference distance $d_{ref}$.

First reference line 136B2 extends in the same direction, here the row direction of viewing screen 108, during the entire exemplary distance-measurement operation described below. This arises because the screen distance representing dimensional calibration distance $d_{cal}$ extends in that direction in the exemplary measurement operation of FIGS. 9a-9d. However, the screen distance representing dimensional calibration distance $d_{cal}$ may extend in a direction different from the initial direction of first reference line 136B2. If so, first reference line 136B2 correspondingly alters its orientation during the course of the distance measurement so as to later extend in the direction of calibration distance $d_{cal}$.

Figure 9C:
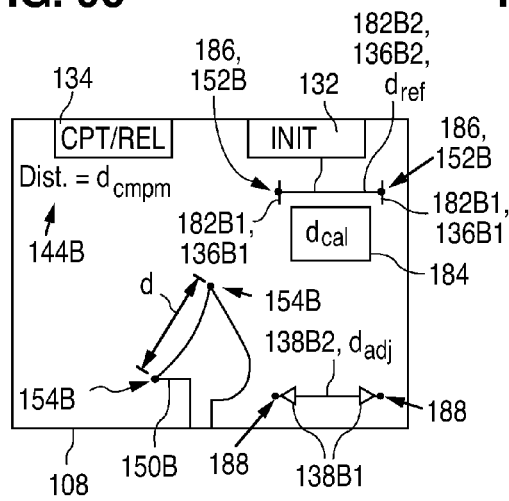

General second reference icon 138 is implemented with a pair of second reference end-point icons 138B1 in the distance-measurement embodiment. Second reference end-point icons 138B1 demarcate a pair of second reference end points 188 separated by an adjustable distance $d_{adj}$ given in (non-dimensional) normalized linear screen units. FIGS. 9a-9c depict non-dimensional adjustable distance $d_{adj}$ as initially extending in the row direction of viewing screen 108. However, adjustable distance $d_{adj}$ can initially extend in the column direction or in any other direction on screen 108.

Each of second reference end-point icons 138B1 consists of an arrowhead (or isosceles triangle) pointing in the direction of adjustable distance $d_{adj}$ away from the arrowhead of the other of reference end-point icons 138B1. Second reference end points 188 are respectively located at the tips of the arrowheads. A straight second reference line 138B2 extends between second reference end points 188 and thus between second reference end-point icons 138B1 to form a composite second reference icon 138B1/138B2 denoted for simplicity as second reference icon "138B".

Consequently, second reference line 138B2 extends in the direction of adjustable distance $d_{adj}$.

As indicated below, second reference line 138B2 typically alters its orientation during the course of the distance measurement so as to extend in directions different from its initial direction. Adjustable distance $d_{adj}$ thereby typically correspondingly alters its orientation during the course of the distance measurement so as to extend in directions different from its initial direction.

Reference end points 186 and 188 are illustrated as somewhat large dots in FIGS. 9*a*-9*d* for location clarity. However, reference end points 186 and 188 simply represent point locations and therefore need not actually be visible, especially since first reference end points 186 are respectively located where first reference end-point icons 136B1 meet first reference line 136B2, and second reference end points 188 are respectively located where second reference end-point icons 138B1 meet second reference line 138B2. Reference end points 186 and 188 need only be trackable in computer 104.

Information-presentation device 100 employs a Pythagorean computer algorithm provided in computer 104 to determine the value of reference distance $d_{ref}$ in normalized linear screen units at any time. For the general situation in which distance $d_{ref}$ can extend in any direction and thus potentially in a direction different from the row or column direction of viewing screen 108, the $d_{ref}$ computer algorithm determines the instantaneous value of distance $d_{ref}$ as the square root of the sum of (a) the square of the distance in normalized linear screen units from a further point, spaced apart from end points 186 of first reference icon 136B, to one of end points 186 in one of a pair of substantially perpendicular measurement directions and (b) the square of the distance in normalized linear screen units from the further point to the other of end points 186 in the other of the measurement directions.

One of the measurement directions for determining reference distance $d_{ref}$ is normally one of the row and column directions of viewing screen 108, the other of the measurement directions then being the other of the row and column directions. In that case, the $d_{ref}$ computer algorithm for the general situation simplifies to determining the instantaneous value of distance $d_{ref}$ as the square root of the sum of (a) the square of the distance in normalized linear screen units from a further point, spaced apart from end points 186 of first reference icon 136B, to one of end points 186 in the column direction and (b) the square of the distance in normalized linear screen units from the further point to the other of end points 186 in the row direction. The distance in normalized linear screen units from the further point to that one of end points 186 in the column direction is the difference in normalized screen units between the distances measured from a suitable column-direction reference location such as the top or bottom of screen 108 along the column direction to the further point and that end point 186. The distance in normalized linear screen units from the further point to that other of end points 186 in the row direction is the difference in normalized screen units between the distances measured from a suitable row-direction reference location such as the left-hand or right-hand side of screen 108 along the row direction to the further point and that other end point 186.

Reference distance $d_{ref}$ extends in the row direction of viewing screen 108 in the exemplary screen views of FIGS. 9*a* and 9*b*. In that case, the $d_{ref}$ computer algorithm is not needed to determine distance $d_{ref}$. Instead, the value of distance $d_{ref}$ is simply the difference in normalized screen units between the distances measured from a suitable row-direction reference location such as the left-hand or right-hand side of screen 108 along the row direction to first reference end points 186. If distance $d_{ref}$ extends in the column direction of screen 108, the value of distance $d_{ref}$ is similarly simply the difference in normalized screen units between the distances measured from a suitable column-direction reference location such as the top or bottom side of screen 108 along the column direction to end points 186.

General adjustable parameter p is normally implemented with adjustable distance $d_{adj}$ in the distance-measurement embodiment. Information-presentation device 100 employs a Pythagorean computer algorithm provided in computer 104 to determine the value of adjustable distance $d_{adj}$ in normalized linear screen units at any time. Taking into account the fact that adjustable distance $d_{adj}$ may extend in directions different from its initial row direction during the course of the distance measurement, the $d_{adj}$ computer algorithm generally determines the instantaneous value of distance $d_{adj}$ as the square root of the sum of (a) the square of the distance in normalized linear screen units from a further point, spaced apart from end points 188 of second reference icon 138B, to one of end points 188 in one of a pair of substantially perpendicular measurement directions and (b) the square of the distance in normalized linear screen units from the further point to the other of end points 188 in the other of the measurement directions.

One of the measurement directions for determining adjustable distance $d_{adj}$ is normally one of the row and column directions of viewing screen 108, the other of the measurement directions then being the other of the row and column directions. In that case, the $d_{adj}$ computer algorithm simplifies to determining the instantaneous value of distance $d_{adj}$ as the square root of the sum of (a) the square of the distance in normalized linear screen units from a further point, spaced apart from end points 188 of second reference icon 138B, to one of end points 188 in the column direction and (b) the square of the distance in normalized linear screen units from the further point to the other of end points 188 in the row direction. The distance in normalized linear screen units from the further point to that one of end points 188 in the column direction is the difference in normalized screen units between the distances measured from a suitable column-direction reference location such as the top or bottom of screen 108 along the column direction to the further point and that end point 188. The distance in normalized linear screen units from the further point to that other of end points 188 in the row direction is the difference in normalized screen units between the distances measured from a suitable row-direction reference location such as the left-hand or right-hand side of screen 108 along the row direction to the further point and that other end point 188.

Computer 104 computes a distance $d_{cmp}$ at any time as $d_{cal} d_{adj}/d_{ref}$. As described further below, computed distance $d_{cmp}$ reaches a final value $d_{cmpf}$ that approximately equals selected distance d under measurement. Since distance $d_{cmp}$ instantaneously equals $d_{cal} d_{adj}/d_{ref}$, final computed distance value $d_{cmpf}$ equals $d_{cal} d_{adjf}/d_{reff}$, where $d_{adjf}$ is the final value of adjustable distance d, and $d_{reff}$ is the final value of reference distance $d_{ref}$.

General adjustable parameter reference equation 144 on viewing screen 108 is implemented with an adjustable distance reference equation 144B in the distance-measurement embodiment. Adjustable distance reference equation 144B presents the instantaneous value of computed distance $d_{cmp}$. For exemplary purposes, reference equation 144B appears on screen 108 as "Dist.=" followed by the then-existent value of calculated distance $d_{cmp}$, typically without distance units because they are the same as the distance units for calibration distance $d_{cal}$. At the stage of FIG. 9a, reference equation 144B appears as "Dist.=$d_{cmp0}$" where distance $d_{cmp0}$ is an arbitrary computed distance calculated as $d_{cal0}d_{adj0}/d_{ref0}$, $d_{cal0}$ is the above-mentioned arbitrary initial value, e.g., 1, of calibration distance $d_{cal}$, $d_{adj0}$ is an arbitrary initial value of adjustable distance $d_{adj}$, and $d_{ref0}$ is an arbitrary initial value of reference distance $d_{ref}$. If calibration box 184 is empty at the stage of FIG. 9a, reference equation 144B appears as "Dist.=" followed by a blank space.

Distance measurement is performed in the following way. Referring to FIG. 9a, the user instructs initialization control icon 132 to cause each item requiring initialization to be initialized. The initialization instruction is provided by bringing an instructing object largely into contact with initialization icon 132. Reference icons 136B and 138B are thereby initialized to respective locations near the bottom right-hand corner of viewing screen 108 with first reference icon 136B being higher than second reference icon 138B on screen 108. Reference distance $d_{ref}$ between first reference end points 186 is initialized to arbitrary initial value $d_{ref0}$. Adjustable distance $d_{adj}$ between second reference end points 188 is initialized to arbitrary initial value $d_{adj0}$. Initial distance values $d_{ref0}$ and $d_{adj0}$ are typically the same and are sufficiently great, e.g., 100 normalized linear screen units each, that the actual distance between first reference end points 186 and the actual distance between second reference end points 188 are clearly visible on viewing screen 108. Adjustable angle reference equation 144B is placed in the above-described initial form, i.e., reference equation 144B appears as "Dist.=$d_{cmp0}$" or as "Dist.=" followed by a blank space.

Reference distance $d_{ref}$, the distance between reference end points 186 of first reference icon 136A in normalized linear screen units, is initialized to an initial value $d_{refi}$. Adjustable distance $d_{adj}$, the distance between reference end points 188 of second reference icon 138A in normalized linear screen units, is initialized to an initial value $d_{adji}$. Computed distance $d_{cmp}$ is initialized to an initial value $d_{cmpi}$ which equals $d_{cal}d_{adji}/d_{refi}$ and which, upon assigning a non-zero value to calibration distance $d_{cal}$, is non-zero.

The user next enters a non-zero value for calibration distance $d_{cal}$ into calibration box 184 as indicated in FIG. 9b. The $d_{cal}$ value entered into box 184 is normally dimensionless because the distance units measured for selected distance d are the same as the distance units for calibration distance $d_{cal}$.

Entry of the $d_{cal}$ value into calibration box 184 is normally performed by first bringing an instructing object largely into contact with box 184. This causes a software keyboard to appear on viewing screen 108. The user then brings an instructing object largely into contact with selected (numerical) keys on the software keyboard to inform information-presentation device 100 of the $d_{cal}$ value after which the user brings an instructing object largely into contact with a suitable data entry key, e.g., "Enter" to enter the $d_{cal}$ value into box 184 and cause the keyboard to disappear. Since adjustable distance reference equation 144B presents the instantaneous value of computed distance $d_{cmp}$, equation 144B automatically updates to "Dist.=$d_{cmpi}$" where $d_{cmpi}$ represents a number equal to the numerical value of $d_{cal}d_{adji}/d_{refi}$. Alternatively, the initialization action can be performed after entering the $d_{cal}$ value into box 184 as long as the initialization action allows the $d_{cal}$ value to remain in box 184 and equation 144B to appear as "Dist.=$d_{cmpi}$".

FIG. 9b depicts an exemplary situation in which scene feature 150B is close to the left-hand edge of viewing screen 108 with only one of distance end points 154B of feature 150B appearing on screen 108. This location of scene feature 150B is both inconvenient and unsuitable for performing the distance measurement.

The objective of the next two steps is to reach a situation, illustrated by FIG. 9c, in which reference end-point icons 136B1 of first reference icon 136B are respectively approximately superimposed on calibration end points 152B in a captured frame of an image of the scene with scene feature 150B closer to the center of viewing screen 108 so that both distance end points 154B of feature 150B appear on screen 108. Preferably, reference end points 186 of first reference icon 136B are respectively approximately superimposed on calibration end points 152B in the captured frame. If optional calibration line 182B2 of calibration icon 182B is present, reference line 136B2 of first reference icon 136B is then approximately superimposed on calibration line 182B2 in the captured frame. If optional calibration end-point icons 182B1 of calibration icon 182B are present, reference end-point icons 136B1 are preferably respectively approximately superimposed on calibration end-point icons 182B1 in the captured frame.

In the superimpose-first route, the user first causes reference end-point icons 136B1 of first reference icon 136B to be respectively approximately superimposed on calibration end points 152B. The superimposition action is normally performed by (i) bringing an instructing object largely into contact with one of first reference end-point icons 136B1 and translating (dragging) it over viewing screen 108 with the object until that reference end-point icon 136B1 is approximately superimposed on one of calibration end points 152B and (ii) bringing an instructing object largely into contact with the other of first reference end-point icons 136B1 and translating (dragging) it over screen 108 with the object until that other reference end-point icon 136B1 is approximately superimposed on the other of calibration end points 152B. One of the translations is normally done after the other translation.

The superimposition action in the superimpose-first route is preferably done so that reference end points 186 of first reference icon 136B are respectively approximately superimposed on calibration end points 152B. Reference line 136B2 of first reference icon 136B moves with first reference end points 186. If calibration line 182B2 of calibration icon 182B is present, first reference line 136B2 is then approximately superimposed on calibration line 182B2.

If calibration end-point icons 182B1 of calibration icon 182B are present, the superimposition action in the superimpose-first route is preferably done so that reference end-point icons 136B1 of first reference icon 136B are respectively approximately superimposed on calibration end-point icons 182B1. In the event that first reference end-point icons 136B1 extend significantly non-parallel to calibration end-point icons 182B1 prior to the superimposition action, reference end-point icons 136B1 are suitably rotated to enable them to be respectively approximately superimposed on calibration end-point icons 182B1. Performing the superimposition action so that visually (i) first reference line 136B2 is approximately superimposed on calibration line 182B2 and (ii) first reference end-point icons 136B1 are respectively approximately superimposed on calibration end-point icons 182B1 improves the accuracy of approximately superimposing first reference end points 186 on calibration end points 152B.

After performing the superimposition action in the superimpose-first route, the user rotates or/and translates information-presentation device 100 so that scene feature 150B is close to the center of viewing screen 108 with both distance end points 154B of feature 150B appearing on screen 108. The user then instructs capture/release control icon 134 to cause a frame of the image of that scene to be captured. The frame-capture instruction is supplied by bringing an instructing object largely into contact with capture/release icon 134.

In the capture-first route, the user first rotates or/and translates information-presentation device 100 so that scene feature 150B is close to the center of viewing screen 108 with both distance end points 154B of feature 150B appearing on screen 108. The user then instructs capture/release control icon 134 to cause a frame of an image of that scene to be captured. The frame-capture instruction is supplied by bringing an instructing object largely into contact with capture/release icon 134.

The user continues the capture-first route by causing reference end-point icons 136B1 of first reference icon 136B to be respectively approximately superimposed on calibration end points 152B in the captured frame. The superimposition action is normally performed by (i) bringing an instructing object largely into contact with one of first reference end-point icons 136B1 and translating (dragging) it over viewing screen 108 with the object until that reference end-point icon 136B1 is approximately superimposed on one of calibration end points 152B in the captured frame and (ii) bringing an instructing object largely into contact with the other of first reference end-point icons 136B1 and translating (dragging) it over screen 108 with the object until that other reference end-point icon 136B1 is approximately superimposed on the other of calibration end points 152B in the captured frame. One of the translations is again normally done after the other translation.

Similar to the superimposition action in the superimpose-first route, the superimposition action in the capture-first route is preferably done so that reference end points 186 of first reference icon 136B are respectively approximately superimposed on calibration end points 152B in the captured frame. Reference line 136B2 of first reference icon 136B again moves with first reference end points 186. If calibration line 182B2 of calibration icon 182B is present, first reference line 136B2 is approximately superimposed on calibration line 182B2 in the captured frame.

If calibration end-point icons 182B1 of calibration icon 182B are present, the superimposition action in the capture-first route is also preferably done so that reference end-point icons 136B1 of first reference icon 136B are respectively approximately superimposed on calibration end-point icons 182B1 in the captured frame. In the event that first reference end-point icons 136B1 extend significantly non-parallel to calibration end-point icons 182B1 prior to the superimposition action, reference end-point icons 136B1 again are also suitably rotated to enable them to be respectively approximately superimposed on calibration end-point icons 182B1 in the captured frame. Performing the superimposition action so that visually (i) first reference line 136B2 is approximately superimposed on calibration line 182B2 in the captured frame and (ii) first reference end-point icons 136B1 are respectively approximately superimposed on calibration end-point icons 182B1 in the captured frame improves the accuracy of approximately superimposing first reference end points 186 on calibration end points 152B in the captured frame.

In approximately superimposing reference end-point icons 136B1 of first reference icon 136B respectively on calibration end points 152B, preferably with reference end points 186 of first reference icon 136B respectively approximately superimposed on calibration end points 152B, according to the superimpose-first or capture-first route, distance $d_{ref}$ between reference end points 186 changes from initial value $d_{refi}$ to a value $d_{refm}$ approximately equal to the value of calibration distance $d_{cal}$ in normalized linear screen units. Computer 104 thereby calculates computed distance $d_{cmp}$ as a value $d_{cmpm}$ approximately equal to $d_{cal}d_{adji}/d_{refm}$. A as shown in FIG. 9c, adjustable distance reference equation 144B automatically updates to "Dist.=$d_{cmpm}$" where $d_{cmpm}$ represents a number equal to the numerical value of $d_{cal}d_{adji}/d_{refm}$.

Figure 9D:
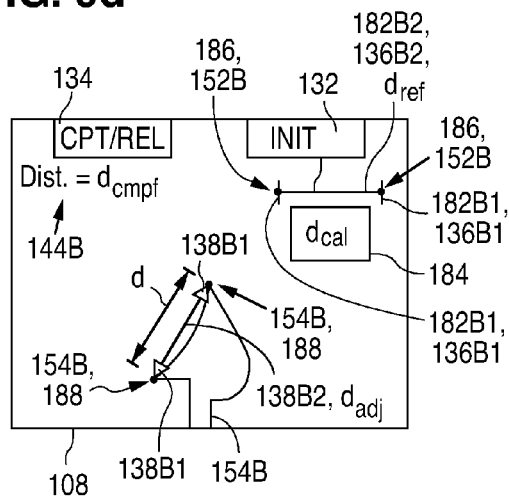

With the captured frame (i) having first reference end-point icons 136B1 respectively approximately superimposed on calibration end points 152B and (ii) preferably also having first reference end points 186 respectively approximately superimposed on calibration end points 152B according to the superimpose-first or capture-first route, the user causes reference end-point icons 138B1 of second reference icon 138B to be respectively approximately superimposed on distance end points 154B of scene feature 150B in the captured frame as shown in FIG. 9d. This second superimposition action is normally performed by (i) bringing an instructing object largely into contact with one of second reference end-point icons 138B1 and translating (dragging) it over viewing screen 108 with the object until that reference end-point icon 138B1 is approximately superimposed on one of distance end points 154B in the captured frame and (ii) bringing an instructing object largely into contact with the other of second reference end-point icons 138B1 and translating (dragging) it over screen 108 with the object until that other reference end-point icon 138B1 is approximately superimposed on the other of distance end points 154B in the captured frame. One of these translations is normally performed after the other translation.

The second superimposition action is preferably done so that reference end points 188 of second reference icon 138B are preferably respectively approximately superimposed on distance end points 154B of scene feature 150B in the captured frame. Reference line 138B2 of second reference icon 138B moves with second reference end points 188. As a result, second reference line 138B2 approximately extends between distance end points 154B in the captured frame. Performing the second superimposition action so that visually second reference line 138B2 approximately extends between distance end points 154B in the captured frame improves the accuracy of approximately superimposing second reference end points 188 on distance end points 154B.

In approximately superimposing reference end-point icons 138B1 of second reference icon 138B1 respectively on distance end points 154B of scene feature 150B in the captured frame preferably with reference end points 188 of second reference icon 138B respectively approximately superimposed on distance end points 154B, distance $d_{adj}$ between reference end points 188 of second reference icon 138B changes from initial value $d_{adji}$ to final value $d_{adjf}$ approximately equal to the value of distance d under measurement but in normalized linear screen units rather than the actual distance units of distance d and calibration distance $d_{cal}$. Reference distance $d_{ref}$ is now final value $d_{reff}$ which equals $d_{refm}$ because distance $d_{ref}$ stays constant during the second superimposition action. Final adjustable distance value $d_{adjf}$ in normalized linear screen units is converted to final computed distance value $d_{cmpf}$, the approximate value of distance d being measured, in distance units by multiplying final value $d_{adjf}$ by $d_{cmp}/d_{reff}$.

Computer 104 performs the preceding conversion by calculating computed distance value $d_{cmpf}$ as $d_{cal}d_{adjf}/d_{reff}$. In performing this calculation, computer 104 determine final adjustable distance value $d_{adjf}$ in normalized linear screen units using the above-mentioned $d_{adj}$ algorithm with the values to the indicated distances to end points 188 of second reference icon 138B being the final values in the captured frame. Computer 104 determines final reference distance value $d_{reff}$ in normalized linear screen units (a) using the above-mentioned $d_{ref}$ algorithm if reference distance $d_{ref}$ extends in a direction different from the row and column directions in the captured frame with the values to the indicated distances to end points 186 of first reference icon 136B being the values in the captured frame, (b) as the difference in normalized screen units between the distances measured from a suitable row-direction reference location along the row direction to first reference end points 186 in the captured frame if reference distance $d_{ref}$ extends in the row direction in the captured frame as occurs in the exemplary final screen view of FIG. 9d, or (c) as the difference in normalized screen units between the distances measured from a suitable column-direction reference location along the column direction to end points 186 in the captured frame if reference distance $d_{ref}$ extends in the column direction in the captured frame.

Adjustable distance $d_{adj}$ normally undergoes a sequence of time-wise intermediate values, continuously determined by information-presentation device 100 using the $d_{adj}$ algorithm, in changing from initial value $d_{adji}$ to final value $d_{adjf}$ as reference end-point icons 138B1 of second reference icon 138B1 are in the process of respectively being approximately superimposed on distance end points 154B. Using the timewise intermediate values of adjustable distance $d_{adj}$, information-presentation device 100 normally further determines corresponding timewise intermediate values of computed distance $d_{cmp}$ as $d_{cal}d_{adjv}/d_{ref}$ where $d_{adjv}$ represents the changing instantaneous value of adjustable distance $d_{adj}$.

Adjustable distance reference equation 144B normally continuously presents the timewise intermediate values of computed distance $d_{cmp}$. As adjustable distance $d_{adj}$ is changing from initial value $d_{adji}$ to final value $d_{adjf}$, equation 144B therefore normally undergoes continuous changing so as to instantaneously appear as "Dist.=$d_{cmpv}$" where $d_{cmpv}$ represents the changing instantaneous value of computed distance $d_{cmp}$. As indicated in FIG. 9d, equation 144B finally changes to "Dist.=$d_{cmpf}$" where final computed distance value $d_{cmpf}$ the approximate value of distance d under measurement, is a number equal to the numerical value of $d_{cal}d_{adjf}/d_{reff}$. This completes the distance measurement.

Additional measurements can be performed on other parts of scene feature 150B or on parts of other scene features in the scene containing scene feature 150B without again performing the first superimposition action, i.e., without approximately superimposing end-point icons 136B1 of first reference icon 136B1 respectively on calibration end points 152B, if the value of calibration distance $d_{cal}$ is suitable for these other parts of scene feature 150B or the parts of the other scene features in the scene containing scene feature 150B. Only the frame capture and the second superimposition action need be performed on the other parts of scene feature 150B or on the parts of other scene features in the scene containing scene feature 150B. The same applies to different scenes for which the value of calibration distance $d_{cal}$ is suitable.

F. Curvature Measurement

A third embodiment of information-presentation device 100 is directed to curvature measurement in the course of curve fitting with a symmetric or asymmetric curve whose curvature is dependent on only one adjustable parameter.

FIGS. 10a-10d (collectively "FIG. 10") illustrate changes in the appearance of viewing screen 108 in the curvature-measurement embodiment of device 100 as the measurement operation proceeds using such a symmetric curve. FIGS. 11a-11d (collectively "FIG. 11") illustrate changes in the appearance of screen 108 in the curvature-measurement embodiment as the measurement operation proceeds using an asymmetric curve dependent on only one adjustable parameter.

General second reference icon 138 is implemented with an adjustable reference curve 138C in the curvature-measurement embodiment of FIG. 10 or 11. A curve is symmetric when it is symmetric about some straight line. In the exemplary screen views of FIG. 10, reference curve 138C is symmetric because it is symmetric about a straight line extending through a reference point 190 on reference curve 138C. Reference curve 138C in the exemplary screen views of FIG. 11 is asymmetric because it does not meet this symmetry requirement.

Adjustable reference curve 138C has a curvature controlled with a single adjustable parameter implemented here with adjustable parameter p described above. Reference curve 138C is therefore representable with a curve function controlled by adjustable parameter p. The curve function, referred to as function f(x,p) where x again is an independent variable, may be formed with any one of: (a) a power function for a power different from 1 and 0, i.e., $q(p)x^n$, $x^{r(p)n}$, or $q(p)x^{r(p)n}$ where each of q(p) and r(p) is a function, e.g., p itself, varying only with parameter p, and n is a non-unity integer, positive or negative, and thus different from 1 and 0; (b) a polynomial function having only one adjustable parameter, e.g., $q_0(p)+q_1(p)x+q_2(p)x^2+q_3(p)x^3$ and so on where $q_0(p)$, $q_1(p)$, $q_2(p)$, $q_3(p)$, and so on are functions varying only with parameter p; (c) a basic exponential function, i.e., $q(p)a^x$, $a^{r(p)x}$, or $q(p)a^{r(p)x}$ where a is a constant, e.g., a rational number or an irrational number, such as e, or a function solely of parameter p; (d) a basic logarithmic function, i.e., $q(p)\log_b[x]$, $\log_b[r(p)x]$, or $q(p)\log_b[r(p)x]$ where b is the logarithm's base, e.g., a rational number such as 10 or an irrational number such as e; (e) a basic non-inverse trigonometric function, i.e., $q(p)\sin[x]$, $\sin[r(p)x]$, or $q(p)\sin[r(p)x]$ and so on for cosine, tangent, secant, cosecant, and cotangent; (f) a basic inverse trigonometric function, i.e., $q(p)\sin^{-1}[x]$, $\sin^{-1}[r(p)x]$, or $q(p)\sin^{-1}[r(p)x]$ and so on for inverse cosine, inverse tangent, inverse secant, inverse cosecant, and inverse cotangent; (g) a basic non-inverse hyperbolic function, i.e., $q(p)\sin h[x]$, $\sin h[r(p)x]$, or $q(p)\sin h[r(p)x]$ and so on for hyperbolic cosine, hyperbolic tangent, hyperbolic secant, hyperbolic cosecant, and hyperbolic cotangent; (h) a basic inverse hyperbolic function, i.e., $q(p)\sin h^{-1}[x]$, $\sin h^{-1}[r(p)x]$, or $q(p)\sin h^{-1}[r(p)x]$ and so on for inverse hyperbolic cosine, inverse hyperbolic tangent, inverse hyperbolic secant, inverse hyperbolic cosecant, and inverse hyperbolic cotangent, and (j) a combination of any two or more of the preceding eight functions for which parameter p is the only adjustable parameter.

Computer 104 normally stores a group of functions of the preceding types. Using a menu, e.g., a drop-down menu, available on a portion (not separately indicated in FIG. 10 or 11) of viewing screen 108, the user can select any of these functions as curve function f(x,p). Information-presentation device 100 also normally provides a capability by which the user can enter a selected function into computer 104 to be used as curve function f(x,p).

Curve function f(x,p) is (i) symmetric for FIG. 10 in which reference curve 138C is symmetric and (ii) asymmetric for FIG. 11 in which reference curve 138C is asymmetric. As one example, function f(x,p) for reference curve 138C in FIG. 10 could be the symmetric parabolic function $px^2$. As another example, function f(x,p) for reference curve 138C in FIG. 11 could be the asymmetric function $px^3$.

General first reference icon 136 is implemented with a reference-point icon 136C, typically circular, in the curvature-measurement embodiment. Reference-point icon 136C demarcates reference point 190 on reference curve 138C. Accordingly, reference-point icon 136C is largely centered on reference point 190.

For location clarity, reference point 190 is illustrated as a somewhat large dot in FIGS. 10a-10d and 11a-11d. However, reference point 190 simply represents a point location and therefore need not actually be visible. Reference point 190 need, in fact, only be trackable in computer 104.

To facilitate curve fitting and attendant curvature measurement, reference point 190 often has a characteristic which distinguishes it from other points on reference curve 138C. In particular, reference point 190 typically occurs at an extremum, i.e., maximum or minimum, of reference curve 138C when it is symmetric as occurs in FIG. 10. The extremum can be an absolute extremum or a local extremum. Reference point 190 is sometimes an inflection point of reference curve 138C when it is asymmetric. In FIG. 11, reference point 190 is an inflection point.

General scene feature 150 is replaced in FIGS. 10a-10d or FIGS. 11a-11d with a scene feature 150C having a curved portion 154C, usually referred to hereafter as scene curve 154C or simply curve 154C, which implements second scene location 154 in general scene location 150. The curvature of scene curve 154C is to be measured. This measurement is to be performed in the course of fitting part of adjustable reference curve 138C to scene curve 154C.

Scene curve 154C has a point 152C, often referred to here as selected point 152C, which implements first scene location 152 in general scene location 150. As with reference point 190, selected point 152C often has a characteristic which distinguishes it from other points on scene curve 154C in order to facilitate the curve fitting and attendant curvature measurement. Selected point 152C typically occurs at an extremum, absolute or local, of scene curve 154C when it is symmetric or approximately symmetric. Selected point 152C is sometimes an inflection point, or close to an inflection point, of scene curve 154C when it is asymmetric.

The curvature of scene curve 154C is to be determined approximately as the curvature of adjustable reference curve 138C when part of reference curve 138C is fitted to scene curve 154C with reference point 190 of reference curve 138C approximately superimposed on selected point 152C. The curvature of reference curve 138C can be described in various ways. The value, referred to as final value $p_f$, of adjustable parameter p when part of reference curve 138C is fitted to scene curve 154C in the preceding manner constitutes an indicator of the curvature of reference curve 138C at that point and thus an indicator of the approximate curvature of scene curve 154C. Final adjustable parameter value $p_f$ can even be deemed the curvature of reference curve 138C when part of it is fitted to scene curve 154C in the preceding manner and thus approximately the curvature of scene curve 154C.

Information-presentation device 100 employs a fitting-calculation computer algorithm provided in computer 104 to determine the value of adjustable parameter p at any time. For this purpose, curve function f(x,p) for reference curve 138C is expressed as f(x,p)=y where y again is a dependent variable. Curve function f(x,p) is solved for adjustable parameter p to produce a parameter function expressed as g(x,y)=p. As one example, if function f(x,p) for reference curve 138C in FIG. 10 is the above-mentioned symmetric parabolic function $px^2$, corresponding parameter function g(x,y) is $y/x^2$. As another example, if function f(x,p) for reference curve 138C in FIG. 11 is the above-mentioned asymmetric function $px^3$, corresponding parameter function g(x,y) is $y/x^3$. The value of parameter p at any time is the value of parameter function g(x,y) for a value of variable x at that time and the corresponding value of variable y at that time.

For the functions which computer 104 makes available as curve function f(x,p), computer 104 normally also makes the corresponding solved functions available as parameter function g(x,y) to the extent that the solved functions are expressible in closed form. The solved functions are normally accessible from a menu, e.g., a drop-down menu, available on a portion (not separately indicated in FIG. 10 or 11) of viewing screen 108. For instance, the menu presenting the functions available as curve function f(x,p) may also present the solved functions available as parameter function g(x,y).

With the preceding in mind, the fitting-calculation computer algorithm determines the value of parameter p from parameter function g(x,y) by using (a) the distance in normalized linear screen units from a further point along a first straight line to a first point on reference curve 138C as the value of variable x in parameter function g(x,y) and (b) the distance in normalized linear screen units from the further point along a second straight line, perpendicular to the first line, to a second point on reference curve 138C as the value of variable y in parameter function g(x,y). If the x and y directions respectively are the row and column directions of viewing screen 108, the first straight line extends in the column direction, and the second straight line extends in the row direction. The opposite arises if the x and y directions respectively are the column and row directions.

General adjustable parameter reference equation 144 on viewing screen 108 is implemented with an adjustable curvature reference equation 144C in the curvature-measurement embodiment. For exemplary purposes, adjustable parameter p is here assumed to be the curvature of adjustable reference curve 138C rather than an indicator of the curvature of reference curve 138C. In accordance with this assumption, adjustable curvature reference equation 144C appears on screen 108 as "Curv.=" followed by the then-existent value of adjustable parameter p.

General function reference equation 146 on screen 108 is implemented with a curvature function reference equation 146C in the curvature-measurement embodiment. Since curve function f(x,p) can represent any one of many functions of single parameter p, curvature function reference equation 146C appears on screen 108 in the general form "f(x,p)=f(x,$p_v$)" where "$p_v$" once again represents the instantaneous value of adjustable parameter p.

Figure 10A:
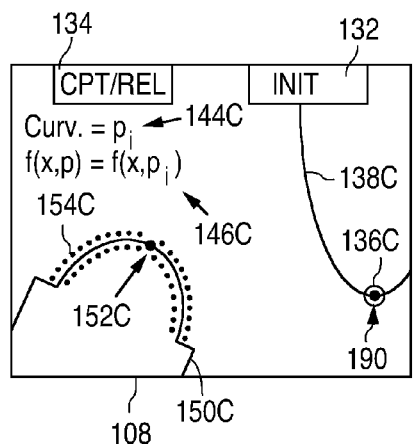
FIGS. 10a, 10b, 10c, and 10d are front views of the viewing screen in an embodiment of the information-presentation device of FIG. 5 during curve fitting with a symmetric reference curve and attendant measurement of the curvature.
Figure 11A:
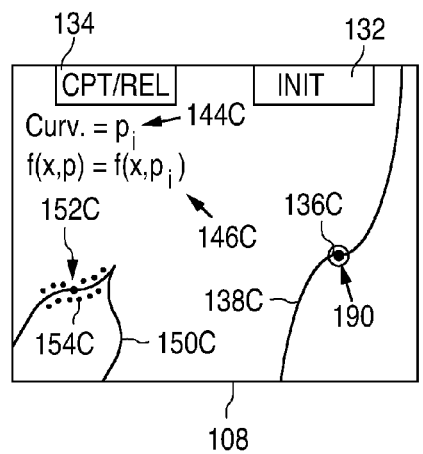
FIGS. 11a, 11b, 11c, and 11d are front views of the viewing screen in an embodiment of the information-presentation device of FIG. 5 during curve fitting with an asymmetric reference curve and attendant measurement of the curvature.

Curve fitting and curvature measurement are performed in the following way. Referring to FIG. 10a or 11a, the user instructs initialization control icon 132 to cause each item requiring initialization to be initialized. The initialization instruction is supplied by bringing an instructing object largely into contact with initialization icon 132. Adjustable curvature reference equation 144C is initialized to appear as "Curv.=$p_i$" where $p_i$ is the initial value of adjustable parameter p. Curvature function reference equation 146C is similarly initialized to appear as "f(x,p)=f(x,$p_i$)" where f(x,$p_i$) is the initial value of curve function f(x,p). Reference-point icon 136C and reference curve 138C are initialized to a location near the right-hand side of viewing screen 108.

Figure 10B:
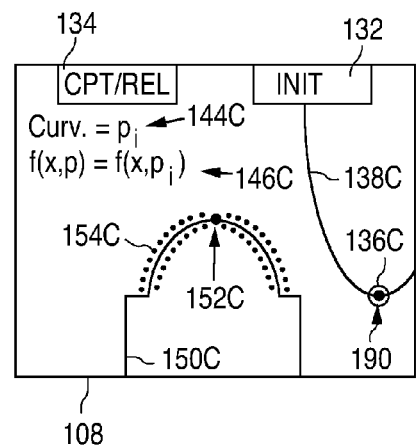
Figure 11B:
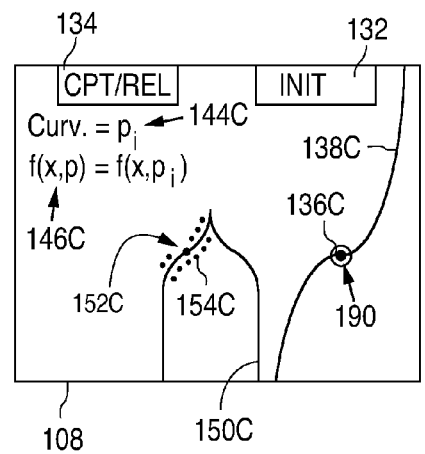

Scene feature 150C is close to the left-hand edge of viewing screen 108 in the initial screen view of FIG. 10a or 11a. This location of scene feature 150C is inconvenient for performing the curve fitting and curvature measurement. Consequently, the user typically rotates or/and translates information-presentation device 100 to bring scene feature 150C closer to the center of screen 108 as indicated in FIG. 10b or 11b.

Figure 10C:
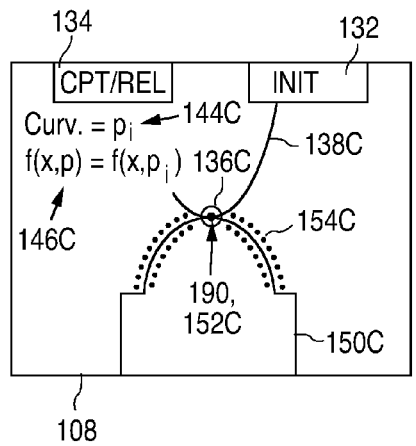
Figure 11C:
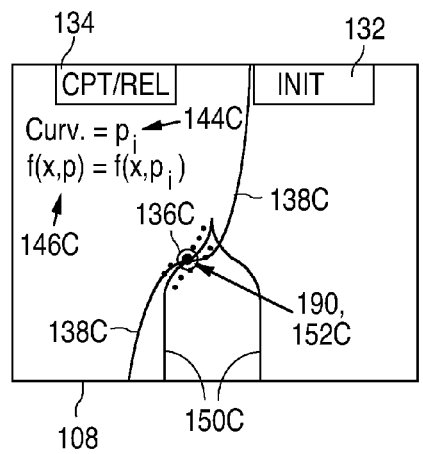

The purpose of the next two steps is to reach a situation, illustrated by FIG. 10c or 11c, in which reference-point icon 136C is approximately superimposed on selected point 152C of scene feature 150C in a captured frame of an image of the scene with scene feature 150C close to the center of viewing screen 108.

In the superimpose-first route, the user further rotates or/and translates information-presentation device 100 until reference-point icon 136C is approximately superimposed on selected point 152C of scene feature 150C as shown in FIG. 10c or 11c. The superimposition action is preferably done so that reference point 190 is approximately superimposed on selected point 152C.

Additionally, the superimposition action is performed so that points on reference curve 138C are situated approximately opposite corresponding points of scene curve 154C. For instance, if reference curve 138C is symmetric as in FIG. 10 and therefore has an imaginary straight symmetry line (not shown) about which reference curve 138C is symmetric, information-presentation device 100 is rotated or/and translated until this symmetry line is approximately situated over a corresponding imaginary straight symmetry line about which scene curve 154C is approximately symmetric. If reference point 190 divides reference curve 138C into a pair of branches at an angle of 180° to each other as occurs in FIG. 11, points on reference curve 138C are automatically situated approximately opposite the corresponding points of scene curve 154C. In any event, after achieving this superimposition condition, the user instructs capture/release control icon 134 to cause a frame of an image of that scene to be captured. The frame-capture instruction is furnished by bringing an instructing object largely into contact with capture/release icon 134.

In the capture-first route, the user instructs capture/release control icon 134 to cause a frame of an image of the scene to be captured with scene feature 150C close to the center of viewing screen 108 as indicated in FIG. 10b or 11b and with reference curve 138C oriented relative to scene curve 154C so that, upon completion of the first superimposition action, points on reference curve 138C are situated approximately opposite the corresponding points of scene curve 154C. For example, if reference curve 138C is symmetric as in FIG. 10 and has the above-mentioned imaginary straight symmetry line, information-presentation device 100 is rotated or/and translated until this symmetry line is approximately parallel to, or approximately situated over, the corresponding imaginary symmetry line of scene curve 154C. The frame-capture instruction is furnished by bringing an instructing object largely into contact with capture/release icon 134.

The user then causes reference-point icon 136C to be approximately superimposed on selected point 152C as depicted in FIG. 10c or 11c. Preferably, reference point 190 is approximately superimposed on selected point 152C. The superimposition action is normally achieved by bringing an instructing object largely into contact with reference-point icon 136C and translating (dragging) it over viewing screen 108 with the object until icon 136C is visually approximately situated over selected point 152C. Because reference curve 138C was oriented relative to scene curve 154C in the above-described manner immediately prior to the superimposition action, points on reference curve 138C are situated approximately opposite the corresponding points of scene curve 154C in the captured frame.

The approximate superimposition reference-point icon 136C on selected point 152C, preferably with reference point 190 approximately superimposed on selected point 152C, does not cause adjustable parameter p to change. Parameter p is therefore still at initial value $p_i$ in the captured frame at the stage of FIG. 10c or 11c. Adjustable parameter reference equation 144C still appears as "Curv.=$p_i$". Function reference equation 146C similarly still appears as "f(x,p)=f(x,$p_i$)".

Figure 10D:
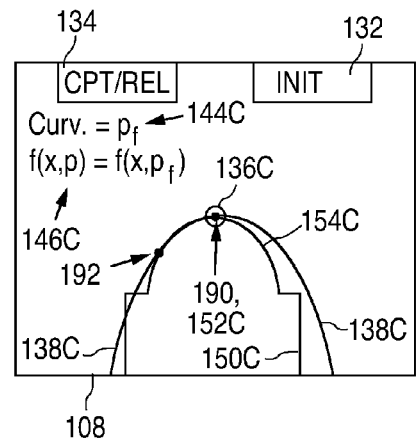
Figure 11D:
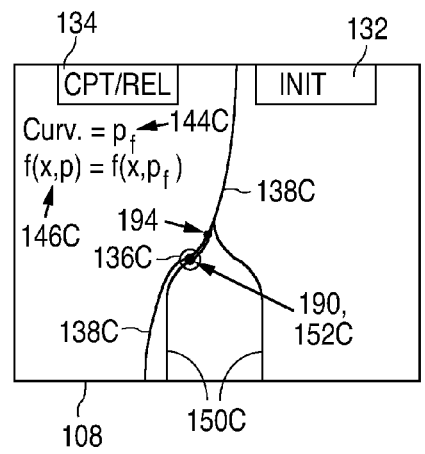

With the captured frame having reference-point icon 136A approximately superimposed on selected point 152C according to the superimpose-first or capture-first route and with points on reference curve 138C situated approximately opposite the corresponding points of scene curve 154C in the captured frame, the user causes reference curve 138C to alter its shape in the captured frame until reference curve 138C is approximately superimposed on scene curve 154C as shown in FIG. 10d or 11d. More particularly, reference curve 138C has two branches extending from reference point 190. Scene curve 154C has two branches extending from selected point 152C. One of the branches of reference curve 138C rotates in one direction about reference point 190, and changes curvature, until that branch is approximately superimposed on one of the branches of scene curve 154C in the captured frame. The other branch of reference curve 138C simultaneously rotates in the opposite direction about reference point 190, and changes curvature, until that other branch is approximately superimposed on the other branch of scene curve 154C in the captured frame.

The curve rotation and attendant curvature change are normally achieved by (i) bringing an instructing object largely into contact with an additional point situated on one of the branches of reference curve 138C and spaced apart from reference point 190 and (ii) and translating the additional point with the object over viewing screen 108 to an additional point situated on one of the branches of scene curve 154C and spaced apart from selected point 152C. The point-translation action causes the additional-point branch of reference curve 138C to rotate about reference point 190 in one direction and change curvature so as to be approximately superimposed on the additional-point branch of scene curve 154C in the captured frame with the so-translated additional point on reference curve 138C overlying the additional point on scene curve 154C. The other branch of reference curve 138C automatically rotates about reference point 190 in the opposite direction and changes curvature so as to be approximately superimposed on the other branch of scene curve 154C in the captured frame.

Item 192 in FIG. 10d indicates an exemplary location for the additional points on reference curve 138C and scene curve 154 in the symmetric-curve situation of FIG. 10. Item 194 in FIG. 11d similarly indicates an exemplary location for the additional points on reference curve 138C and scene curve 154 in the asymmetric-curve situation of FIG. 11. In the examples of FIGS. 10 and 11, the final superimposition accuracy is somewhat better for the additional-point branches of curves 138C and 154C than for the other branches of curves 138C and 154C.

The approximate superimposition of reference curve 138C on scene curve 154C in the captured frame causes adjustable parameter p to change from initial value $p_i$ to final value $p_f$ which, in the example of FIG. 10 or 11, is approximately the curvature of scene curve 154C. Computer 104 determines final adjustable parameter value $p_f$ using the above-mentioned fitting-calculation computer algorithm. The distances used in the fitting-calculation computer algorithm are those in the captured frame.

Adjustable parameter p normally goes through a sequence of time-wise intermediate values, continuously determined by information-presentation device 100, in changing from initial value $p_i$ to final value $p_f$ as reference curve 138C undergoes the process of being approximately superimposed on scene curve 154C. Adjustable curvature reference equation 144C normally continuously presents the timewise intermediate values of parameter p. As parameter p is changing from initial value $p_i$ to final value $p_f$, equation 144C thus normally undergoes continuous changing so as to instantaneously appear as "$p=p_v$," where $p_v$ again represents the changing instantaneous value of parameter p. As shown in FIG. 10d or 11d, equation 144C finally changes to "Curv.=$p_f$" where $p_f$ here is a number equal to the numerical value of the final computed curvature and thus approximately the curvature of scene curve 154C.

Information-presentation device 100 also determines the corresponding time-wise intermediate values of curve function f(x,p). Curvature function reference equation 146C normally continuously presents the timewise intermediate values of curvature function f(x,p). As parameter p is changing from initial value $p_i$ to final value $p_f$, equation 146C thereby normally undergoes continuous changing so as to instantaneously appear as "f(x,p)=f(x,$p_v$)" where instantaneous parameter value $p_v$ explicitly appears in curve function "f(x,$p_v$)". As indicated in FIG. 10d or 11d, equation 146C finally changes to "f(x,p)=f(x,$p_f$)" where f(x,$p_f$) is curve function f(x,p) with the $p_f$ numerical value substituted for symbol p. This completes the curve fitting and curvature measurement.

G. Physical Embodiment

FIGS. 12a and 12b respectively illustrate the front and back sides of a mobile physical embodiment of information-presentation device 100. Viewing screen 108 on the front side extends between parallel straight lines 200 and 202. Item 204 on screen 108 is a focus icon used to bring the scene into better focus. Bringing an instructing object largely into contact with focus icon 204 causes computer 104 to employ a focusing algorithm that brings the scene on viewing screen 108 into improved focus. Item 206 below screen 108 is a button for returning screen 108 to its home-screen view from which the angle-measurement, distance-measurement, or curvature-measurement screen view of device 100 can generally be accessed.

Item 208 on the backside is lens opening for image-gathering component 106. Information-presentation device 100 is preferably provided with the capability to take still digital pictures. Item 210 on the backside is a camera flash for providing flash lighting while taking still digital pictures.

In addition to providing the above-mentioned capabilities, information-presentation device 100 is normally employed as an intelligent telephone. Item 212 at the top of device 100 is a power button. Pressing power button 212 turns device 100 actively on. Pressing button 212 again places device 100 in standby mode.

Item 214 along one side of information-presentation device 100 is a ringer-control button. Pressing ringer-control button 214 causes device 100 to provide an audible ringing sound upon receiving an incoming telephone call. Pressing button 214 again cause device 100 to silence the ringing and go into a vibrating mode to announce an incoming telephone call. Items 216 and 218 along that side of device 100 are volume-control buttons for controlling the speaker (voice) volume if a telephone call is in progress or the ringer volume if no telephone call is in progress. Pressing button 216 increases the volume. Pressing button 218 decreases the volume

H. Variations

While the invention has been described with reference to particular embodiments, this description is solely for the purpose of illustration and is not to be construed as limiting the scope of the invention claimed below. For instance, vertex reference control icon 174, reference end-point icons 136B1 and 136B2, and reference-point icon 136C in the angle-measurement, distance-measurement, and curvature-measurement embodiments of information-presentation device 100 can be shaped differently that described above. Vertex reference control icon 174 and reference-point icon 136C can be shaped as squares respectively centered on reference vertex point 172 and reference point 190.

Each first reference end-point icon 136B1 can be shaped as an arrowhead pointing in the direction of reference distance $d_{ref}$ away from the arrowhead of the other reference end-point icon 136B1 with first reference end points 186 respectively located at the tips of the arrowheads. Each second reference end-point icon 138B1 can formed with a short straight line extending perpendicular to the direction of adjustable distance $d_{adj}$ such that the two icon lines are respectively largely centered on second reference end points 188 at least in the direction of adjustable distance $d_{adj}$. Reference end-point icons 136B1 and 138B1 can also be shaped as circles or squares respectively centered on reference end points 186 and 188.

Adjustable parameter p can be implemented with a function of adjustable reference angle $\alpha_{adj}$ in the angle-measurement embodiment of information-presentation device 100, rather than directly with adjustable angle $\alpha_{adj}$, so that changes in the function of adjustable angle $\alpha_{adj}$ cause corresponding changes in angle $\alpha_{adj}$ on a one-to-one basis. Parameter p can similarly be implemented with a function of adjustable distance $d_{adj}$ in the distance-measurement embodiment of device 100, rather than directly with adjustable distance $d_{adj}$, so that changes in the function of adjustable distance $d_{adj}$ cause corresponding changes in distance $d_{adj}$ on a one-to-one basis. More particularly, parameter p can be implemented with the ratio $d_{adj}/d_{ref}$ in the distance-measurement embodiment.

The manner in which general icons 136 and 138 are implemented in the distance-measurement embodiment can be different than described above. First reference icon 136 can be implemented with reference line 136B2 of first reference icon 136B. This implementation is particularly appropriate if first reference end-point icons 136B1 are absent in the distance-measurement embodiment. Reference line 136B2 is then approximately superimposed on calibration line 182B2 of calibration icon 182B in the superimposition action of both the superimpose-first and capture-first routes. In doing so, reference end points 186 of first reference icon 136B are preferably respectively approximately superimposed on calibration end points 152B so as to improve the accuracy of the superimposition action.

General first reference icon 136 can also be implemented with end points 186 of first reference icon 136B in the distance-measurement embodiment. This additional implementation is particularly appropriate if first reference line 136B2 or/and first reference end-point icons 136B1 are absent in the distance-measurement embodiment. First reference end points 186 of the resultant icon are then respectively approximately superimposed on calibration end points 152B in the superimposition action of both the superimpose-first and capture-first routes.

General second reference icon 138 can similarly be implemented with end points 188 of second reference icon 138B in the distance-measurement embodiment. This implementation is particularly appropriate if second reference line 138B2 or/and second reference end-point icons 138B1 are absent in the distance-measurement embodiment. Second reference end points 188 of the resultant icon are then respectively approximately superimposed on distance end points 154B of scene feature 150B.

General reference icons 136 and 138 can, in the distance-measurement embodiment, be respectively implemented with second reference end-point icons 138B1 or with second reference end points 188. This additional alternative is especially appropriate if additional distance measurements are performed on other parts of scene feature 150B or on parts of other scene features in the scene containing scene feature 150B without again performing the first superimposition action.

Viewing screen 108 can present multiple pairs of general reference icons 136 and 138, each general reference icon pair having a reference characteristic controlled with only a single adjustable parameter. The shapes of both of general reference icons 136 and 138 can be functions of adjustable parameter p.

The SA input structure may be so configured as to largely be a part of viewing screen 108 rather than strictly adjacent to screen 108. If so, the SA input structure is an input structure of screen 108. Each statement above specifying that an instructing object is brought largely into contact with a portion of SA input structure adjacent to the corresponding portion of screen 108 is to be interpreted to mean that the instructing object is brought largely into contact with the input structure of screen 108. Various modifications may thus be made by those skilled in the art without departing from the true scope of the invention as defined in the appended claims.

I claim:

1. A device comprising:
   a viewing screen which presents first and second reference icons having an adjustable reference characteristic controlled with substantially only a single adjustable parameter;
   an image-gathering component for providing the screen with frames of a video image of a scene in which first and second scene locations have a scene characteristic whose value is to be approximately determined; and
   a control system responsive to external instruction (a) for causing a frame of the image of the scene to be captured while the first reference icon is approximately superimposed on the first scene location or for causing a frame of the image of the scene to be captured and then for causing the first reference icon to be approximately superimposed on the first scene location in the captured frame and (b) for causing the second reference icon to be approximately superimposed on the second scene location in the captured frame as the adjustable parameter is adjusted to enable the reference characteristic to approximately match the scene characteristic, the device determining the value of the adjustable parameter, or the value of a further parameter containing the adjustable parameter, as an approximation to the value of the scene characteristic in the captured frame when the first and second reference icons are respectively approximately superimposed on the first and second scene locations in the captured frame.

2. A device as in claim 1 wherein the screen displays the value of the adjustable or further parameter when the first and second reference icons are respectively approximately superimposed on the first and second scene locations in the captured frame.

3. A device as in claim 1 wherein the screen displays the value of the adjustable or further parameter substantially continuously during operation of the device.

4. A device as in claim 1 wherein the control system uses a computer algorithm to determine the value of the adjustable or further parameter.

5. A device as in claim 1 wherein the approximate superimposition of the second reference icon on the second scene location in the captured frame includes causing the second reference icon to be translated or/and rotated in response to external instruction provided with an object moving over the screen.

6. A device as in claim 1 wherein the control system is responsive to external instruction for adjusting a control icon on the screen so as to cause at least one of the reference icons to be adjusted.

7. A device as in claim 1 wherein:
   the first reference icon comprises a first reference line;
   the first scene location comprises a first scene line such that the frame of the image is captured while the first reference line is approximately superimposed on the first scene line or the frame of the image is captured and the first reference line is then approximately superimposed on the first scene line;
   the second reference icon comprises a second reference line deployable at an adjustable reference angle to the first reference line, the reference angle implementing, or varying with, the adjustable parameter;
   the second scene location comprises a second scene line at an angle to the first scene line such that the second reference line is approximately superimposed on the second scene line in the captured frame by a procedure in which the control system adjusts the reference angle in response to external instruction so as to cause the second reference line to rotate until the reference angle approximately matches the angle between the scene lines; and
   the device determines value of the reference angle in the captured frame as an approximation to the value of the angle between the scene lines.

8. A device as in claim 7 wherein:
   the first scene line, or a straight-line approximation to the first scene line if it is materially curved, and the second scene line, or a straight-line approximation to the second scene line if it is materially curved, meet actually or by imaginary extension at a scene vertex point;
   the reference lines meet at a reference vertex point demarcated by a vertex reference control icon;
   the control system causes (a) the vertex reference control icon to translate in response to external instruction until the vertex reference control icon is approximately superimposed on the scene vertex point in the captured frame and (b) the second reference line to rotate about the reference vertex point in response to external instruction until the second reference line is approximately superimposed on the second scene line in the captured frame; and the device determines the value of the reference angle in the captured frame as either (a) the inverse tangent of the ratio of (i) the distance in normalized linear screen units from a further point, spaced apart from the reference vertex point, on the first reference line to the second reference line along a perpendicular to the first reference line in the captured frame to (ii) the distance in normalized linear screen units from the further point to the reference vertex point in the captured frame or (b) the inverse cotangent of the inverse ratio of these two distances in the captured frame.

9. A device as in claim 1 wherein:

the first reference icon comprises a pair of first reference end-point icons which respectively demarcate a pair of first reference end points separated by a reference distance;

the first scene location comprises a pair of calibration end points separated by a calibration distance such that the frame of the image is captured while the first reference end-point icons are respectively approximately superimposed on the calibration end points or the frame of the image is captured and the first reference end-point icons are then respectively approximately superimposed on the calibration end points;

the second reference icon comprises a pair of second reference end-point icons which respectively demarcate a pair of second reference end points separated by an adjustable distance which implements, or varies with, the adjustable parameter;

the second scene location comprises a pair of distance end points separated by a selected distance under measurement such that the second reference end-point icons are approximately superimposed on the distance end points in the captured frame by a procedure in which the control system adjusts the adjustable distance in response to external instruction until the adjustable distance approximately equals the selected distance in the captured frame; and the device approximates the value of the selected distance as $d_{cal}d_{adj}/d_{ref}$ where $d_{cal}$ is the calibration distance, $d_{adj}$ is the adjustable distance in normalized linear screen units in the captured frame, and $d_{ref}$ is the reference distance in normalized linear screen units in the captured frame.

10. A device as in claim 9 wherein the first reference icon further includes a reference line extending between first reference end point icons.

11. A device as in claim 9 wherein the second reference icon further includes a reference line extending between second reference end point icons.

12. A device as in claim 9 wherein the device determines the value $d_{adj}$ of the adjustable distance in the captured frame as the square root of the sum of (a) the square of the distance in normalized linear screen units from a further point, spaced apart from the second reference end points, to one of the second reference end points in one of a pair of substantially perpendicular measurement directions in the captured frame and (b) the square of the distance in normalized linear screen units from the further point to the other of the second reference end points in the other of the measurement directions in the captured frame.

13. A device as in claim 1 wherein:

the first reference icon comprises a reference-point icon which demarcates a reference point;

the first scene location comprises a selected point on a scene curve such that the frame of the image is captured while the reference-point icon is approximately superimposed on the selected point or the frame of the image is captured and the reference-point icon is then approximately superimposed on the selected point;

the second reference icon comprises a reference curve whose curvature is controlled by the adjustable parameter;

the second scene location comprises the scene curve such that the reference curve is approximately superimposed on the scene curve in the captured frame by a procedure in which the control system adjusts the adjustable parameter in response to external instruction for enabling the reference curve to approximately match the scene curve in the captured frame; and the device determines the value of an indicator of the curvature of the reference curve in the captured frame as an approximation to the value of a like indicator of the curvature of the scene curve.

14. A device as in claim 13 wherein the screen presents a function representing the reference curve in the captured frame with the value of the indicator of the curvature of the reference curve in the captured frame being presented in the function.

15. A device as in claim 13 wherein the reference curve is representable by a function consisting of one of: a power function for a power different from one, a polynomial function having only one adjustable parameter, a basic exponential function, a basic logarithmic function, a basic non-inverse trigonometric function, a basic inverse trigonometric function, a basic non-inverse hyperbolic function, a basic inverse hyperbolic function, and a combination of any two or more of the preceding eight functions for which there is only one adjustable parameter.

16. A device as in claim 13 wherein:

the reference curve is represented by a curve function expressible as $f(x,p)=y$ where x is an independent variable, y is a dependent variable, and p is the adjustable parameter, the value of parameter p in the captured frame being the value of the indicator of the curvature of the reference curve in the captured frame and thereby approximately the value of the indicator of the curvature of the scene curve;

the curve function is solved for adjustable parameter p to produce a parameter function expressible as $g(x,y)=p$; and the device determines the value of parameter p in the captured frame from parameter function $g(x,y)$ by using (a) the distance in normalized linear screen units from a further point along a first straight line to a first point on the reference curve in the captured frame as the value of variable x in parameter function $g(x,y)$ and (b) the distance in normalized linear screen units from the further point along a second straight line, perpendicular to the first line, to a second point on the reference curve in the captured frame as the value of variable y in parameter function $g(x,y)$.

17. A method of operating a device having an image-gathering component and a viewing screen which presents first and second reference icons having an adjustable reference characteristic controlled with substantially only a single adjustable parameter, the image-gathering component providing the screen with frames of a video image of a scene in which first and second scene locations have a scene characteristic whose value is to be approximately determined, the method comprising:

capturing a frame of the image of the scene;
approximately superimposing the first reference icon on the first scene location before or after capturing the frame of the image of the scene such that the first reference icon is so superimposed on the first scene location in the captured frame;
approximately superimposing the second reference icon on the second scene location in the captured frame as the adjustable parameter is adjusted to enable the reference characteristic to approximately match the scene characteristic; and
determining the value of the adjustable parameter, or the value of a further parameter containing the adjustable parameter, as an approximation to the value of the scene characteristic in the captured frame when the first and second reference icons are respectively approximately superimposed on the first and second scene locations in the captured frame.

18. A method as in claim 17 wherein the capturing and superimposing acts are substantially performed in response to external instruction provided by at least one human.

19. A method as in claim 17 wherein the act of approximately superimposing the first reference icon on the first scene location is performed before capturing the frame of the image of the scene and includes rotating or/and translating the device so as to cause the first scene location to move on the screen.

20. A method as in claim 17 wherein the act of approximately superimposing the second reference icon on the second scene location in the captured frame comprises moving an object over the screen so as to cause the second reference to translate or/and rotate.

21. A method as in claim 20 wherein the object comprises an elongated inanimate object or a finger of a human hand.

22. A method as in claim 17 wherein the superimposing acts include adjusting a control icon on the screen so as to cause at least one of the reference icons to be adjusted.

23. A method as in claim 17 further including displaying the value of the adjustable or further parameter on the screen when the first and second reference icons are respectively approximately superimposed on the first and second scene locations in the captured frame.

24. A method as in claim 17 wherein:
the first reference icon comprises a first reference line;
the first scene location comprises a first scene line such that the act of approximately superimposing the first reference icon on the first scene location comprises approximately superimposing the first reference line on the first scene line before or after capturing the frame of the image of the scene;
the second reference icon comprises a second reference line deployable at a reference angle to the first reference line, the reference angle implementing, or varying with, the adjustable parameter;
the second scene location comprises a second scene line at an angle to the first scene line such that the act of approximately superimposing the second reference icon on the second scene location comprises approximately superimposing the second reference line on the second scene line in the captured frame by a procedure in which the adjustable parameter is adjusted to cause the second reference line to rotate until the reference angle approximately matches the angle between the scene lines in the captured frame; and
the determining act comprises determining the value of the reference angle in the captured frame as an approximation to the value of the angle between the scene lines.

25. A method as in claim 24 wherein:
the first scene line, or a straight-line approximation to the first scene line if it is materially curved, and the second scene line, or a straight-line approximation to the second scene line if it is materially curved, meet actually or by imaginary extension at a scene vertex point;
the reference lines meet at a reference vertex point demarcated by a vertex reference control icon;
the act of approximately superimposing the second reference line on the second scene line includes (a) translating the vertex reference control icon until the vertex reference control icon is approximately superimposed on the scene vertex point in the captured frame and (b) rotating the second reference line about the reference vertex point until the second reference line is approximately superimposed on the second scene line in the captured frame; and
the determining act includes determining the value of the reference angle in the captured frame as either (a) the inverse tangent of the ratio of (i) the distance in normalized linear screen units from a further point, spaced apart from the reference vertex point, on the first reference line to the second reference line along a perpendicular to the first reference line in the captured frame to (ii) the distance in normalized linear screen units from the further point to the reference vertex point in the captured frame or (b) the inverse cotangent of the inverse ratio of these two distances in the captured frame.

26. A method as in claim 17 wherein:
the first reference icon comprises a pair of first reference end-point icons which respectively demarcate a pair of first reference end points separated by a reference distance;
the first scene location comprises a pair of calibration end points separated by a calibration distance such that the act of approximately superimposing the first reference icon on the first scene location comprises approximately superimposing the first reference end-point icons on the calibration end points before or after capturing the frame of the image of the scene;
the second reference icon comprises a pair of second reference end-point icons which respectively demarcate a pair of second reference end points separated by an adjustable distance which implements, or varies with, the adjustable parameter;
the second scene location comprises a pair of distance end points separated by a selected distance under measurement such that the act of approximately superimposing the second reference icon on the second scene location comprises approximately superimposing the second reference line on the selected distance in the captured frame by a procedure in which the adjustable distance is adjusted until it approximately equals the selected distance in the captured frame; and
the determining act comprises approximating the value of the selected distance as $d_{cal} d_{adj}/d_{ref}$ where $d_{cal}$ is the calibration distance, $d_{adj}$ is the value of the adjustable distance in normalized linear screen units in the captured frame, and $d_{ref}$ is the value of the reference distance in normalized linear screen units in the captured frame.

27. A method as in claim 26 wherein the first reference icon further includes a reference line extending between first reference end point icons.

28. A method as in claim 26 wherein the second reference icon further includes a reference line extending between second reference end point icons.

29. A method as in claim 17 wherein:
the first reference icon comprises a reference-point icon which demarcates a reference point;
the first scene location comprises a selected point on a scene curve such that the act of approximately superimposing the first reference icon on the first scene location comprises approximately superimposing the reference-point icon on the selected point before or after capturing the frame of the image of the scene;
the second reference icon comprises a reference curve whose curvature is controlled by the adjustable parameter;
the second scene location comprises the scene curve such that the act of approximately superimposing the second reference icon on the second scene location comprises approximately superimposing the reference curve on the scene curve in the captured frame by a procedure in which the adjustable parameter is adjusted to enable the reference curve to approximately match the scene curve in the captured frame; and
the determining act comprises determining the value of an indicator of the curvature of the reference curve in the captured frame as an approximation to the value of a like indicator of the curvature of the scene curve.

30. A method as in claim 29 wherein:
the reference curve is represented by a curve function expressible as $f(x,p)=y$ where x is an independent variable, y is a dependent variable, and p is the adjustable parameter, the value of parameter p in the captured frame being the value of the indicator of the curvature of the reference curve in the captured frame and thereby approximately the value of the indicator of the curvature of the scene curve;
the curve function is solved for adjustable parameter p to produce a parameter function expressible as $g(x,y)=p$; and
the determining act includes determining the value of parameter p from parameter function $g(x,y)$ by using (a) the distance in normalized linear screen units from a further point along a first straight line to a first point on the reference curve in the captured frame as the value of variable x in parameter function $g(x,y)$ and (b) the distance in normalized linear screen units from the further point along a second straight line, perpendicular to the first line, to a second point on the reference curve in the captured frame as the value of variable y in parameter function $g(x,y)$.

\* \* \* \* \*